US010849339B2

(12) United States Patent
Prakash et al.

(10) Patent No.: US 10,849,339 B2
(45) Date of Patent: Dec. 1, 2020

(54) BEVERAGES CONTAINING RARE SUGARS

(71) Applicant: The Coca-Cola Company, Atlanta, GA (US)

(72) Inventors: Indra Prakash, Alpharetta, GA (US); Juvenal Higiro, Atlanta, GA (US); Robert Scott, Douglasville, GA (US); Gil Ma, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 15/635,617

(22) Filed: Jun. 28, 2017

(65) Prior Publication Data

US 2017/0295827 A1   Oct. 19, 2017

Related U.S. Application Data

(63) Continuation of application No. 14/212,410, filed on Mar. 14, 2014, now Pat. No. 9,717,267, which is a continuation-in-part of application No. 14/050,840, filed on Oct. 10, 2013, now abandoned.

(60) Provisional application No. 61/783,073, filed on Mar. 14, 2013.

(51) Int. Cl.
*A23L 2/60* (2006.01)
*A23L 2/54* (2006.01)
*A23L 2/52* (2006.01)

(52) U.S. Cl.
CPC ........ *A23L 2/60* (2013.01); *A23L 2/52* (2013.01); *A23L 2/54* (2013.01)

(58) Field of Classification Search
CPC ................. A23L 2/60; A23L 2/54; A23L 5/52
See application file for complete search history.

(56) References Cited

U.S. PATENT DOCUMENTS

| 2006/0083838 | A1 | 4/2006 | Jackson et al. |
| 2007/0082106 | A1 | 4/2007 | Lee et al. |
| 2007/0116823 | A1 | 5/2007 | Prakash |
| 2007/0128331 | A1 | 6/2007 | Prakash et al. |
| 2009/0130285 | A1 | 5/2009 | Abraham |
| 2009/0304891 | A1 | 12/2009 | Fujihara et al. |
| 2011/0091634 | A1 | 4/2011 | Abelyan |
| 2012/0070534 | A1 | 3/2012 | Suzuki |
| 2012/0076908 | A1 | 3/2012 | Fujihara et al. |
| 2012/0128852 | A1 | 5/2012 | Okpala et al. |

FOREIGN PATENT DOCUMENTS

| EP | 2156751 | 10/2018 |
| EP | 3281534 | 5/2019 |
| WO | WO 2007/0070224 A2 | 6/2007 |
| WO | WO 2010/038911 | 4/2010 |
| WO | WO 2013/096420 A1 | 6/2013 |
| WO | WO 2014/186084 | 11/2014 |
| WO | WO 2015/006763 | 1/2015 |
| WO | WO 2016/023103 | 2/2016 |

OTHER PUBLICATIONS

Third Party Observations Received in EP 14769423.6, mailed Feb. 12, 2016.
Extended European Search Report for EP 14769423.6, dated Jun. 16, 2016.
International Preliminary Report on Patentability for PCT/US2014/027747, dated Sep. 15, 2015.
International Search Report and Written Opinion for PCT/US2014/027747, dated Jul. 30, 2014.
Chaturvedula, V.S.P., Yu, O., Mao, G. 2013. "Structural Characterization of the Hydrolysis Products of Rebaudioside M, A Minor Steviol Glycoside of Stevia Rebaudiana Bertoni." Journal of Chemical and Pharmaceutical Research. vol. 5. pp. 606-611.
Ohta, et al., "Characterization of Novel Steviol Glycosides from Leaves of Stevia rebaudiana Morita", J. Appl. Glycosci, 57, 199-209 (2010).
Third Party Observations filed in European Application No. 14769423.6, mailed May 6, 2019.
Opposition to European Patent EP 2993990, filed by Acapo AS, Aug. 5, 2020.
Opposition to European Patent EP 2993990, filed by Compagnie Gervais Danome, Aug. 13, 2020.
Tada et al. (2013) Chem. Pharm. Bull. 61: 33-38.
Prakash et al. (2014) Foods 3: 162-175.
Wikipedia "Parts-per-notation".
Chung et al. (2012) J. Food Sci., 77: H53-8.
PureCircle Reb A 97.
Cho, Susan, "GRAS exemption claim for D-psicose" NutraSource, Inc., Aug. 11, 2011.

*Primary Examiner* — Nikki H. Dees
(74) *Attorney, Agent, or Firm* — King & Spalding

(57) ABSTRACT

Beverages comprising rare sugars and sweetness enhancers are provided herein, wherein the sweetness enhancers are present at or below the sweetness recognition threshold concentration. Also provided are methods for improving the sweetness of a beverage comprising rare sugars by adding a sweetness enhancer in a concentration at or below its sweetness recognition threshold. Beverages comprising natural high potency sweeteners and rare sugars with sugar-like characteristics are also provided, wherein the natural high potency sweetener and rare sugars are present in particular weight ratios.

7 Claims, No Drawings

BEVERAGES CONTAINING RARE SUGARS

CROSS REFERENCE TO RELATED APPLICATIONS

This application is a continuation of U.S. patent application Ser. No. 14/212,410, filed Mar. 14, 2014, which is a continuation-in-part of U.S. patent application Ser. No. 14/050,840, filed Oct. 10, 2013, which claims priority to U.S. Provisional Patent Application No. 61/783,073, filed Mar. 14, 2013. The contents of the above-referenced documents are hereby fully incorporated by reference herein.

FIELD OF THE INVENTION

The present invention relates generally to beverages containing rare sugars. Specifically, the present invention relates to beverages containing rare sugars and sweetness enhancers, wherein the sweetness enhancer is present in a concentration at or below its sweetness recognition threshold. The present invention also relates to beverages containing rare sugars and natural high potency sweeteners in particular weight ratios. The beverages of the present invention have improved flavor and temporal profiles.

BACKGROUND OF THE INVENTION

Natural caloric sugars, such as sucrose, fructose and glucose, are utilized to provide a pleasant taste to beverages. Sucrose, in particular, imparts a taste preferred by consumers. Although sucrose provides superior sweetness characteristics, it is caloric. Non-caloric or low caloric sweeteners have been introduced to satisfy consumer demand. However, sweeteners within this class differ from natural caloric sugars in ways that continue to frustrate consumers. On a taste basis, non-caloric or low caloric sweeteners exhibit a temporal profile, maximal response, flavor profile, mouth feel, and/or adaptation behavior that differ from sugar. Specifically, non-caloric or low caloric sweeteners exhibit delayed sweetness onset, lingering sweet aftertaste, bitter taste, metallic taste, astringent taste, cooling taste and/or licorice-like taste. On a source basis, many non-caloric or low caloric sweeteners are synthetic chemicals.

Accordingly, the desire for beverages containing natural non-caloric or low caloric sweeteners that taste like beverages containing sucrose remains high.

D-psicose (allulose) is a rare sugar found in small quantities in molasses and isomerized sugars. It can also be prepared enzymatically from D-fructose with epimerase. D-psicose contains almost no calorie content and yields less than about 0.2% metabolic energy of the equivalent amount of sucrose. D-psicose is self-GRAS with a letter of no objection from the US FDA. It is currently approved at a maximum level of 2.1% (w/w) in a non-alcoholic beverage. However, 2% (w/w) D-psicose has a sucrose equivalence of only about 1.26% when prepared in a citric acid/potassium citrate matrix, thereby limiting its use in beverages.

Accordingly, there remains a need to develop beverages containing rare sugars, particularly D-psicose, with increased sucrose equivalence.

SUMMARY OF THE INVENTION

The present invention provides beverages comprising rare sugars, as well as methods of making such beverages. The beverages of the present invention advantageously have an improved flavor and temporal profile over beverages comprising rare sugars known in the art.

In a first aspect, the present invention is a beverage comprising a rare sugar and a sweetness enhancer, wherein the sweetness enhancer is present in a concentration at or below its sweetness recognition threshold.

In one embodiment, the rare sugar is selected from the group consisting of D-allose, D-psicose, L-ribose, D-tagatose, L-glucose, L-fucose, L-arabinose, D-turanose, D-leucrose and combinations thereof. In a particular embodiment, the rare sugar is D-psicose.

In one embodiment, the sweetness enhancer is a steviol glycoside. Suitable steviol glycosides, include, but are not limited to, Rebaudioside A, Rebaudioside C, Rebaudioside D, Rebaudioside F, Rebaudioside H, Rebaudioside N, Rebaudioside K, Rebaudioside J, Rebaudioside O, Rebaudioside M, Rubusoside, Dulcoside A, Dulcoside B and combinations thereof. In a particular embodiment, the sweetness enhancer is Rebaudioside C.

In other embodiments, the sweetness enhancer is a mogrol glycoside. Suitable mogrol glycosides, include, but are not limited to, Mogroside V, Isomogroside, Mogroside IV, Siamenoside and combinations thereof.

In still other embodiments, the sweetness enhancer is a benzoic acid. Suitable hydroxybenzoic acids include, but are not limited to, 3-hydroxybenzoic acid, 4-hydroxybenzoic acid, 2,4-dihydroxybenzoic acid, 3,4-dihydroxybenzoic acid, 2,5-dihydroxybenzoic acid, 2,6-dihydroxybenzoic acid, 2,3,4-trihydroxybenzoic acid, 2,4,6-trihydroxybenzoic acid, 3-aminobenzoic acid, 4-aminobenzoic acid and combinations thereof. In a particular embodiment, the sweetness enhancer is 2,4-dihydroxybenzoic acid.

In yet other embodiment, the sweetness enhancer is a FEMA GRAS enhancer or flavor. Suitable FEMA GRAS enhancers include, but are not limited to, FEMA GRAS enhancer 4469, FEMA GRAS flavor 4701, FEMA GRAS enhancer 4720 (rebaudioside C), FEMA GRAS flavor 4774, FEMA GRAS enhancer 4708, FEMA GRAS enhancer 4728, FEMA GRAS enhancer 4601 (rebaudioside A) and combinations thereof. In a particular embodiment, the sweetness enhancer is FEMA GRAS flavor 4701. In another particular embodiment, the sweetness enhancer is FEMA GRAS flavor 4774.

In a further embodiment, the sweetness enhancer is 4-amino-5-(cyclohexyloxy)-2-methylquinoline-3-carboxylic acid or a salt thereof.

In a particular embodiment, the rare sugar is D-psicose and the sweetness enhancer is Rebaudioside C. In another more particular embodiment, the rare sugar is D-psicose and the sweetness enhancer is 2,4-dihydroxybenzoic acid. In yet another embodiment, the rare sugar is D-psicose and the sweetness enhancer is FEMA GRAS flavor 4701. In a still further embodiment, the rare sugar is D-psicose and the sweetness enhancer is FEMA GRAS flavor 4774.

The rare sugar can be present in the beverage in an amount from about 0.5% to about 12% by weight. The sweetness enhancer can be present in a concentration from about 1 ppm to about 500 ppm (as long as it is at or below the sweetness recognition threshold concentration), such as, for example, from about 5 ppm to about 300 ppm, from about 50 ppm to about 200 ppm or from about 100 ppm to about 200 ppm.

In a second aspect, the present invention is directed to methods for enhancing the sweetness of a beverage. In one embodiment, a method for enhancing the sweetness of a beverage comprises adding a rare sugar and a sweetness enhancer to the beverage, wherein the sweetness enhancer is present in a concentration at or below its sweetness recognition threshold. In one embodiment, the rare sugar is added first to the beverage. In another embodiment, the sweetness enhancer is added first to the beverage. In yet another embodiment, both the rare sugar and the sweetness enhancer are added at the same time to the beverage. The rare sugar can be present in the beverage in an amount from about 0.5% to about 12% by weight. The sweetness enhancer can be present in a concentration from about 1 ppm to about 500 ppm (as long as it is at or below the sweetness recognition threshold concentration).

In another embodiment, a method for enhancing the sweetness of a beverage comprising a rare sugar, comprises (i) providing a beverage comprising a rare sugar; (ii) adding a sweetness enhancer to the beverage in a concentration at or below its sweetness recognition threshold to provide a beverage comprising a rare sugar and a sweetness enhancer.

In a fourth aspect, the present invention is directed to methods for making a sweetened beverage comprising adding a rare sugar and a sweetness enhancer to the beverage, wherein the sweetness enhancer is present in a concentration at or below its sweetness recognition threshold. In one embodiment, the rare sugar is added first to the beverage. In another embodiment, the sweetness enhancer is added first to the beverage. In yet another embodiment, both the rare sugar and the sweetness enhancer are added at the same time to the beverage. The rare sugar can be present in the beverage in an amount from about 0.5% to about 12% by weight. The sweetness enhancer can be present in a concentration from about 1 ppm to about 500 ppm (as long as it is at or below the sweetness recognition threshold concentration).

In a fifth aspect, the present invention is a beverage comprising a rare sugar and a natural high potency sweetener, wherein the natural high potency sweetener is selected from the group consisting of Stevioside, Rebaudioside A, Rebaudioside D, Rebaudioside E, Rebaudioside M, Monatin and its salts, Mogroside IV, Mogroside V, brazzein, thaumatin and combinations thereof.

In one embodiment, the rare sugar is present in an amount from about 0.1% to about 12% by weight.

In another embodiment, the weight ratio of high potency sweetener to rare sugars is from about 1:2 to about 1:3500, such as, for example, about 1:3000, about 1:2500, about 1:2000, about 1:1500, about 1:1000, about 1:900, about 1:800, about 1:700, about 1:600, about 1:500, about 1:400, about 1:300, about 1:200 or about 1:100.

In a particular embodiment, the rare sugar is D-psicose. In a more particular embodiment, the rare sugar is D-psicose and the high potency sweetener is Rebaudioside A. In another more particular embodiment, the rare sugar is D-psicose and the high potency sweetener is Rebaudioside M.

In another particular embodiment, the present invention provides a beverage comprising D-psicose in an amount of about 1% to about 5% by weight and high purity (i.e. >95% pure) Rebaudioside A. In another particular embodiment, the present invention provides a beverage comprising D-psicose in an amount of about 1% to about 5% by weight and high purity (i.e. >95% pure) Rebaudioside M.

In a sixth aspect, the present invention is directed to methods for making a sweetened beverage comprising adding a rare sugar and a high potency sweetener, wherein the high potency sweetener is selected from the group consisting of Stevioside, Rebaudioside A, Rebaudioside D, Rebaudioside E, Rebaudioside M, Monatin and its salts, Mogroside IV, Mogroside V, brazzein, thaumatin and combinations thereof. The rare sugar may be present in an amount from about 0.1% to about 12% by weight. The weight ratio of high potency sweetener to rare sugars can be from about 1:2 to about 1:3500, such as, for example, about 1:3000, about 1:2500, about 1:2000, about 1:1500, about 1:1000, about 1:900, about 1:800, about 1:700, about 1:600, about 1:500, about 1:400, about 1:300, about 1:200 or about 1:100.

The beverages disclosed herein can be any suitable beverage, including a carbonated or non-carbonated beverage. Low- and zero-calories beverages are provided. The beverages can comprise various beverage matrices, preferably citric acid buffer, and one or more additional sweeteners and/or functional ingredients.

DETAILED DESCRIPTION OF THE INVENTION

The present invention is directed to beverages containing rare sugars, particularly where rare sugars are the primary sweeteners in a beverage, as well as methods of making the same or methods of sweetening a beverage comprising a rare sugar.

Sweetness Enhancement of Rare Sugars

In one embodiment, the present invention provides a beverage comprising a rare sugar and a sweetness enhancer, wherein the sweetness enhancer is present in a concentration at or below its sweetness recognition threshold.

The present invention is based on the discovery that certain compounds (referred to herein as "sweetness enhancers") will enhance the detected sweetness (i.e., sucrose equivalence) of a beverage containing one or more rare sugars, wherein the sweetness enhancer is present in a concentration at or below the sweetness recognition threshold.

As used herein, the term "sweetness enhancer" refers to a compound capable of enhancing or intensifying the perception of sweet taste in a composition, such as a beverage. The term "sweetness enhancer" is synonymous with the terms "sweet taste potentiator," "sweetness potentiator," "sweetness amplifier," and "sweetness intensifier."

The term "sweetness recognition threshold concentration," as generally used herein, is the lowest known concentration of a sweet compound that is perceivable by the human sense of taste, typically around 1.0% sucrose equivalence (1.0% SE). While the particular sweetness recognition threshold concentration between sweetness enhancers can vary, generally the concentration of sweetness enhancer is below 500 ppm, such as, for example, from about 5 ppm to about 300 ppm, from about 50 ppm to about 200 ppm or from about 100 ppm to about 200 ppm.

Generally, the sweetness enhancers may enhance or potentiate the sweet taste of sweeteners without providing any noticeable sweet taste by themselves when present at or below the sweetness recognition threshold concentration of a given sweetness enhancer; however, the sweetness enhancers may themselves provide sweet taste at concentrations above their sweetness recognition threshold concentration. The sweetness recognition threshold concentration is specific for a particular enhancer and can vary based on the beverage matrix. The sweetness recognition threshold concentration can be easily determined by taste testing increasing concentrations of a given enhancer until greater than 1.0% sucrose equivalence in a given beverage matrix is detected. The concentration that provides about 1.0% sucrose equivalence is considered the sweetness recognition threshold.

In a particular embodiment, addition of the sweetness enhancer at a concentration at or below its sweetness recognition threshold to a beverage containing one or more rare sugars increases the detected sucrose equivalence of said beverage by an amount more than the detectable sweetness of a solution containing the same concentration of the sweetness enhancer in the absence of any sweeteners.

Addition of a sweetness enhancer of the present invention at a concentration at or below its sweetness recognition threshold to a beverage containing one or more rare sugars may increase the detected sucrose equivalence by about 0.5% or greater, e.g., the sucrose equivalence is increased by greater than about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, about 2%, about 3%, about 4% or about 5%.

In some embodiments, the sucrose equivalence of the beverage can be from about 1.5% to about 12%, such as, for example, about 1.5% to about 10%, about 1.5% to about 5%, about 1.5% to about 3.5% or about 1.5% to about 2.0%.

For example, Rebaudioside C acts as a sweetness enhancer when present below at or below its sweetness recognition threshold concentration in beverages containing from about 0.5% to about 2% D-psicose by weight. Accordingly, the detected sucrose equivalence of beverages containing D-psicose can be increased above 1.2% when Rebaudioside C is added at a concentration at or below its sweetness recognition threshold. For example, the sucrose equivalence can be from about 1.5% to about 3%, such as, for example, about 1.5% to about 2.0%.

The rare sugar may vary. Suitable rare sugars include, but are not limited to, D-allose, D-psicose, L-ribose, D-tagatose, L-glucose, L-fucose, L-arabinose, D-turanose, D-leucrose and combinations thereof.

In some embodiments, the rare sugar is present in the beverage in an amount from about 0.5% to about 12% by weight, such as, for example, about 1.0% by weight, about 1.5% by weight, about 2.0% by weight, about 2.5% by weight, about 3.0% by weight, about 3.5% by weight, about 4.0% by weight, about 4.5% by weight, about 5.0% by weight, about 5.5% by weight, about 6.0% by weight, about 6.5% by weight, about 7.0% by weight, about 7.5% by weight, about 8.0% by weight, about 8.5% by weight, about 9.0% by weight, about 9.5% by weight, about 10.0% by weight, about 10.5% by weight, about 11.0% by weight, about 11.5% by weight or about 12.0% by weight.

In a particular embodiment, the rare sugar is present in the beverage in an amount from about 0.5% of about 10%, such as for example, from about 2% to about 8%, from about 3% to about 7% or from about 4% to about 6% by weight. In a particular embodiment, the rare sugar is present in the beverage in an amount from about 0.5% to about 8% by weight. In another particular embodiment, the rare sugar is present in the beverage in an amount from about 2% to about 8% by weight. In still another embodiment, the rare sugar is present in the beverage in an amount from about 0.5 to about 3.5%.

In one embodiment, the rare sugar is D-allose. In a more particular embodiment, D-allose is present in the beverage in an amount of about 0.5% to about 10% by weight, such as, for example, from about 2% to about 8%.

In another embodiment, the rare sugar is D-psicose. In a more particular embodiment, D-psicose is present in the beverage in an amount of about 0.5% to about 10% by weight, such as, for example, from about 2% to about 8%. In one embodiment, the D-psicose is present in an amount of about 3.5%.

In still another embodiment, the rare sugar is D-ribose. In a more particular embodiment, D-ribose is present in the beverage in an amount of about 0.5% to about 10% by weight, such as, for example, from about 2% to about 8%.

In yet another embodiment, the rare sugar is D-tagatose. In a more particular embodiment, D-tagatose is present in the beverage in an amount of about 0.5% to about 10% by weight, such as, for example, from about 2% to about 8%.

In a further embodiment, the rare sugar is L-glucose. In a more particular embodiment, L-glucose is present in the beverage in an amount of about 0.5% to about 10% by weight, such as, for example, from about 2% to about 8%.

In one embodiment, the rare sugar is L-fucose. In a more particular embodiment, L-fucose is present in the beverage in an amount of about 0.5% to about 10% by weight, such as, for example, from about 2% to about 8%.

In another embodiment, the rare sugar is L-arabinose. In a more particular embodiment, L-arabinose is present in the beverage in an amount of about 0.5% to about 10% by weight, such as, for example, from about 2% to about 8%.

In yet another embodiment, the rare sugar is D-turanose. In a more particular embodiment, D-turanose is present in the beverage in an amount of about 0.5% to about 10% by weight, such as, for example, from about 2% to about 8%.

In yet another embodiment, the rare sugar is D-leucrose. In a more particular embodiment, D-leucrose is present in the beverage in an amount of about 0.5% to about 10% by weight, such as, for example, from about 2% to about 8%.

In some embodiments, the beverage comprises one rare sugar. In other embodiments, the beverage may comprise two or more rare sugars in combination. Any particular combination of the rare sugars provided herein is contemplated.

The sweetness enhancer may vary. Suitable sweetness enhancers include, but are not limited to, steviol glycosides, FEMA GRAS enhancers or flavors, mogrol glycosides, benzoic acid and 1-(2,4-dihydroxyphenyl)-2-(4-hydroxy-3-methoxyphenyl)-ethanone, alone or in combination.

In one embodiment, the sweetness enhancer is a steviol glycoside. Suitable steviol glycosides include, but are not limited to, Rebaudioside A, Rebaudioside C, Rebaudioside D, Rebaudioside F, Rebaudioside H, Rebaudioside N, Rebaudioside K, Rebaudioside J, Rebaudioside O, Rebaudioside M, Rubusoside, Dulcoside A, Dulcoside B and combinations thereof.

In one embodiment, the sweetness enhancer is Rebaudioside A. In a more particular embodiment, Rebaudioside A is present in a concentration of about 30 ppm or less.

In another embodiment, the sweetness enhancer is Rebaudioside C. Rebaudioside C can be present in a concentration from about 100 ppm to about 345 ppm. The sweetness recognition threshold concentration for Rebaudioside C in cola is about 345 ppm. The sweetness recognition threshold concentration for Rebaudioside C in a citric acid/potassium citrate buffer is 270 ppm. In another embodiment, Rebaudioside C is present in a concentration of about 220 ppm, about 210 ppm, about 200 ppm, about 190 ppm, about 180 ppm, about 170 ppm, about 160 ppm, about 150 ppm, about 140 ppm, about 130 ppm, about 120 ppm, about 110 ppm, about 100 ppm, about 90 ppm, about 80 ppm, about 70 ppm, about 60 ppm, about 50 ppm, about 40 ppm, about 30 ppm about 20 ppm or about 10 ppm.

In another embodiment, the sweetness enhancer is Rebaudioside D. In a more particular embodiment, Rebaudioside D is present in a concentration of about 30 ppm or less.

In another embodiment, the sweetness enhancer is Rebaudioside F. In a more particular embodiment, Rebaudioside F is present in a concentration of about 30 ppm or less.

In another embodiment, the sweetness enhancer is Rebaudioside H. In a more particular embodiment, Rebaudioside H is present in a concentration of about 50 ppm or less.

In another embodiment, the sweetness enhancer is Rebaudioside M. In a more particular embodiment, Rebaudioside M is present in a concentration of about 30 ppm or less.

In another embodiment, the sweetness enhancer is Rebaudioside N. In a more particular embodiment, Rebaudioside N is present in a concentration of about 50 ppm or less.

In another embodiment, the sweetness enhancer is Rebaudioside K. In a more particular embodiment, Rebaudioside K is present in a concentration of about 30 ppm or less.

In another embodiment, the sweetness enhancer is Rebaudioside J. In a more particular embodiment, Rebaudioside J is present in a concentration of about 50 ppm or less.

In another embodiment, the sweetness enhancer is Rebaudioside O. In a more particular embodiment, Rebaudioside O is present in a concentration of about 50 ppm or less.

In another embodiment, the sweetness enhancer is Rubusoside. In a more particular embodiment, Rubusoside is present in a concentration of about 150 ppm or less.

In another embodiment, the sweetness enhancer is Dulcoside A. In a more particular embodiment, Dulcoside A is present in a concentration of about 150 ppm or less.

In another embodiment, the sweetness enhancer is Dulcoside B. In a more particular embodiment, Dulcoside B is present in a concentration of about 150 ppm or less.

In particular embodiments, the sweetness enhancer is a steviol glycoside that contains a rhamnose sugar, e.g., Rebaudioside C, Rebaudioside N, Rebaudioside K, Rebaudioside J, Rebaudioside O, Rubusoside, Dulcoside A, Dulcoside B and combinations thereof.

In another embodiment, the sweetness enhancer is a FEMA GRAS enhancer or flavor. Suitable FEMA GRAS flavors include, but are not limited to, FEMA GRAS enhancer 4469, FEMA GRAS flavor 4701, FEMA GRAS enhancer 4720, FEMA GRAS flavor 4774, FEMA GRAS enhancer 4708, FEMA GRAS enhancer 4728, FEMA GRAS enhancer 4601 and combinations thereof.

In one embodiment, the sweetness enhancer is FEMA GRAS enhancer 4469. In a more particular embodiment, FEMA GRAS enhancer 4469 is present in a concentration of about 15 ppm or less.

In one embodiment, the sweetness enhancer is FEMA GRAS flavor 4701. In a more particular embodiment, FEMA GRAS flavor 4701 is present in a concentration of about 15 ppm or less.

In one embodiment, the sweetness enhancer is FEMA GRAS enhancer 4720. In a more particular embodiment, FEMA GRAS enhancer 4720 is present in a concentration of about 250 ppm or less.

In one embodiment, the sweetness enhancer is FEMA GRAS flavor 4774. In a more particular embodiment, FEMA GRAS flavor 4774 is present in a concentration of about 30 ppm or less. In a particular embodiment, FEMA GRAS flavor 4774 is present in a concentration of about 20 ppm.

In one embodiment, the sweetness enhancer is FEMA GRAS enhancer 4708. In a more particular embodiment, FEMA GRAS enhancer 4708 is present in a concentration of about 500 ppm or less.

In one embodiment, the sweetness enhancer is FEMA GRAS enhancer 4728. In a more particular embodiment, FEMA GRAS enhancer 4728 is present in a concentration of about 500 ppm or less.

In one embodiment, the sweetness enhancer is FEMA GRAS enhancer 4601. In a more particular embodiment, FEMA GRAS enhancer 4601 is present in a concentration of about 30 ppm or less.

In still another embodiment, the sweetness enhancer is a mogrol glycoside selected from the group consisting of Mogroside V, Isomogroside, Mogroside IV, Siamenoside and combinations thereof.

In one embodiment, the sweetness enhancer is Mogroside V. In a more particular embodiment, Mogroside V is present in a concentration of about 100 ppm or less.

In one embodiment, the sweetness enhancer is Isomogroside. In a more particular embodiment, Isomogroside is present in a concentration of about 100 ppm or less.

In one embodiment, the sweetness enhancer is Mogroside IV. In a more particular embodiment, Mogroside IV is present in a concentration of about 100 ppm or less.

In one embodiment, the sweetness enhancer is Siamenoside. In a more particular embodiment, Siamenoside is present in a concentration of about 100 ppm or less.

In yet another embodiment, the sweetness enhancer is a benzoic acid selected from the group consisting of 3-hydroxybenzoic acid, 4-hydroxybenzoic acid, 2,4-dihydroxybenzoic acid, 3,4-dihydroxybenzoic acid, 2,5-dihydroxybenzoic acid, 2,6-dihydroxybenzoic acid, 2,3,4-trihydroxybenzoic acid, 2,4,6-trihydroxybenzoic acid, 3-aminobenzoic acid, 4-aminobenzoic acid and combinations thereof.

In one embodiment, the sweetness enhancer is 3-hydroxybenzoic acid. In a more particular embodiment, 3-hydroxybenzoic acid is present in a concentration of about 500 ppm or less.

In one embodiment, the sweetness enhancer is 4-hydroxybenzoic acid. In a more particular embodiment, 4-hydroxybenzoic acid is present in a concentration of about 500 ppm or less.

In one embodiment, the sweetness enhancer is 2,4-dihydroxybenzoic acid. In a more particular embodiment, 2,4-dihydroxybenzoic acid is present in a concentration of about 500 ppm or less.

In one embodiment, the sweetness enhancer is 3,4-dihydroxybenzoic acid. In a more particular embodiment, 3,4-dihydroxybenzoic acid is present in a concentration of about 500 ppm or less.

In one embodiment, the sweetness enhancer is 2,5-dihydroxybenzoic acid. In a more particular embodiment, 2,5-dihydroxybenzoic acid is present in a concentration of about 500 ppm or less.

In one embodiment, the sweetness enhancer is 2,6-dihydroxybenzoic acid. In a more particular embodiment, 2,6-dihydroxybenzoic acid is present in a concentration of about 500 ppm or less.

In one embodiment, the sweetness enhancer is 2,3,4-trihydroxybenzoic acid. In a more particular embodiment, 2,3,4-trihydroxybenzoic acid is present in a concentration of about 500 ppm or less.

In one embodiment, the sweetness enhancer is 2,4,6-trihydroxybenzoic acid. In a more particular embodiment, 2,4,6-trihydroxybenzoic acid is present in a concentration of about 500 ppm or less.

In one embodiment, the sweetness enhancer is 3-aminobenzoic acid. In a more particular embodiment, 3-aminobenzoic acid is present in a concentration of about 500 ppm or less.

In one embodiment, the sweetness enhancer is 4-aminobenzoic acid. In a more particular embodiment, 4-aminobenzoic acid is present in a concentration of about 500 ppm of less.

In one embodiment, the sweetness enhancer is a compound disclosed in WO2006106023, the contents of which are incorporated by reference herein. In a more particular embodiment, the sweetness enhancer is the following compound:

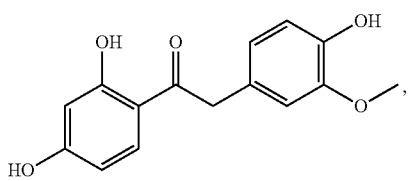 [SMILES: COc1cc(CC(=O)c2ccc(O)cc2O)ccc1O]

1-(2,4-dihydroxyphenyl)-2-(4-hydroxy-3-methoxyphenyl)-ethanone

In a particular embodiment, 1-(2,4-dihydroxyphenyl)-2-(4-hydroxy-3-methoxyphenyl)-ethanone is present in a concentration of about 200 ppm or less.

In one embodiment, the sweetness enhancer is a compound disclosed in WO2007107596, the contents of which are incorporated by reference herein. In a more particular embodiment, the sweetness enhancer is the following compound:

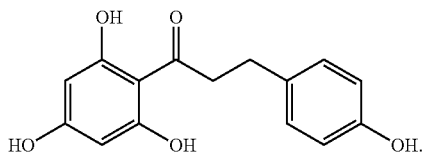 [SMILES: O=C(CCc1ccc(O)cc1)c1c(O)cc(O)cc1O]

4-Hydroxydihydrochalcone

In a particular embodiment, 4-Hydroxydihydrochalcone is present in a concentration of about 200 ppm or less.

In one embodiment, the sweetness enhancer is a compound disclosed in EP2570036, the contents of which are incorporated by reference herein. In a more particular embodiment, the sweetness enhancer is selected from the following compounds:

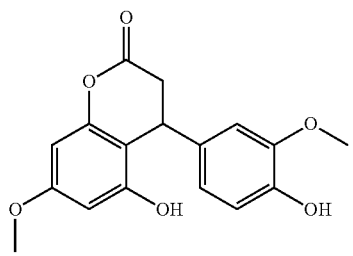

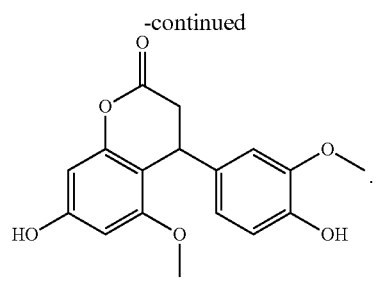

5-hydroxy-4-(4-hydroxy-3-methoxyphenyl)-7-hydroxy-4-(4-hydroxy-3-7-methoxychroman-2-one methoxyphenyl)-5-methoxychroman-2-one In a particular embodiment, 5-hydroxy-4-(4-hydroxy-3-methoxyphenyl)-7-methoxychroman-2-one or 7-hydroxy-4-(4-hydroxy-3-methoxyphenyl)-5-methoxychroman-2-one is present in a concentration of about 200 ppm or less.

In one embodiment, the sweetness enhancer is a compound disclosed in WO2011032967, the contents of which are incorporated by reference herein. In a more particular embodiment, the sweetness enhancer is the following compound:

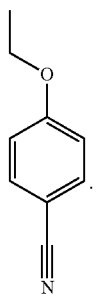

Para-ethoxybenzonitrile

In a particular embodiment, para-ethyoxybenzonitrile is present in a concentration of about 20 ppm or less, such as, for example, from about 0.1 to about 20 ppm.

In one embodiment, the sweetness enhancer is a compound disclosed in WO2009105906, the contents of which are incorporated by reference herein. In a more particular embodiment, the sweetness enhancer is the following compound:

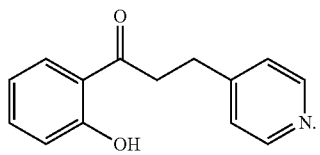 [SMILES: O=C(CCc1ccncc1)c1ccccc1O]

1-(2-hydroxyphenyl)-3-(pyridin-4-yl)propan-1-one

In a particular embodiment, 1-(2-hydroxyphenyl)-3-(pyridin-4-yl)propan-1-one is present in a concentration of about 50 ppm or less.

In one embodiment, the sweetness enhancer is a compound disclosed in WO2008148239, the contents of which are incorporated by reference herein.

In another embodiment, the sweetness enhancer is a compound disclosed in WO2012021837, the contents of which are incorporated by reference herein. In a particular embodiment, the sweetness enhancer is a compound of formula I:

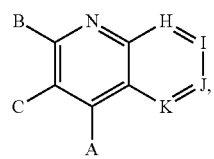

(I)

wherein the substituents are defined as in WO2012021837. In a more particular embodiment, the compound of formula (I) is present in a concentration of about 50 ppm or less.

In another embodiment, the sweetness enhancer is a compound of formula II:

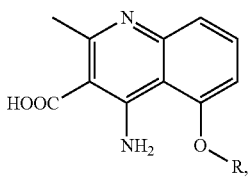

(II)

wherein R is selected from the group consisting of alkyl, substituted alkyl, carbocyclyl, substituted carbocyclyl; aryl, substituted aryl, arylalkyl, substituted arylalkyl, heterocyclyl, substituted heterocyclyl, heteroalkyl, substituted heteroalkyl, heteroaryl, substituted heteroaryl, heteroarylalkyl and substituted heteroarylalkyl. In a more particular embodiment, the compound of formula (II) is present in a concentration of about 50 ppm or less.

In another embodiment, the sweetness enhancer is selected from the group consisting of:

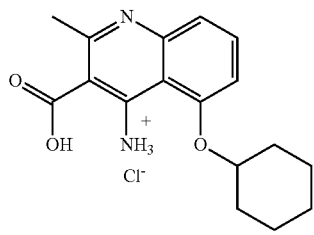

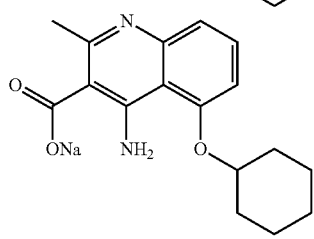

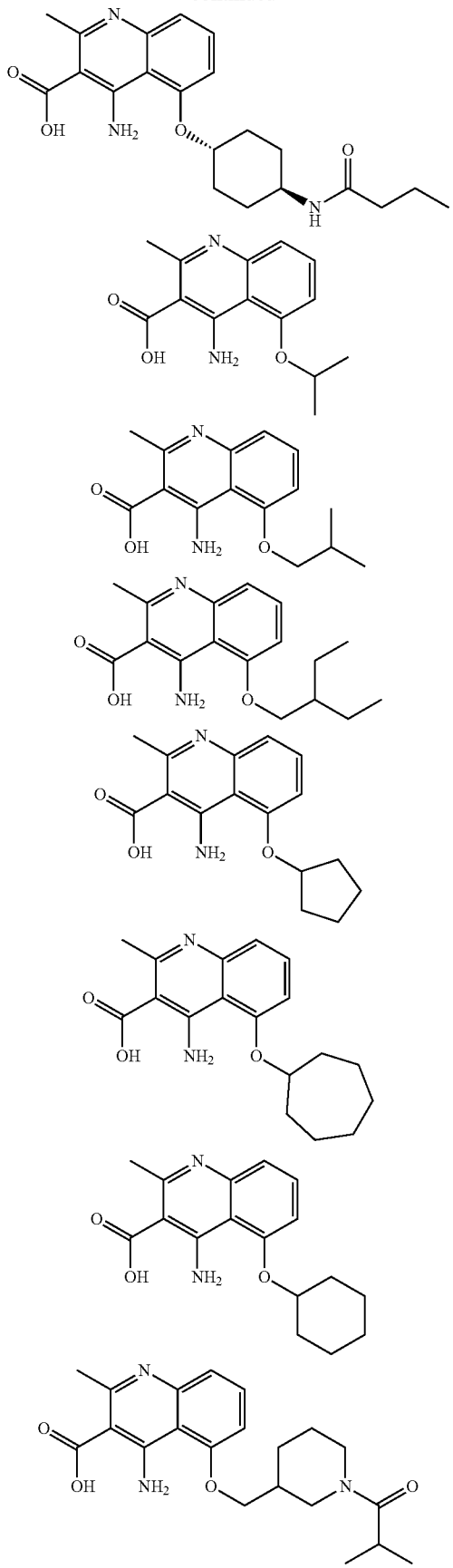

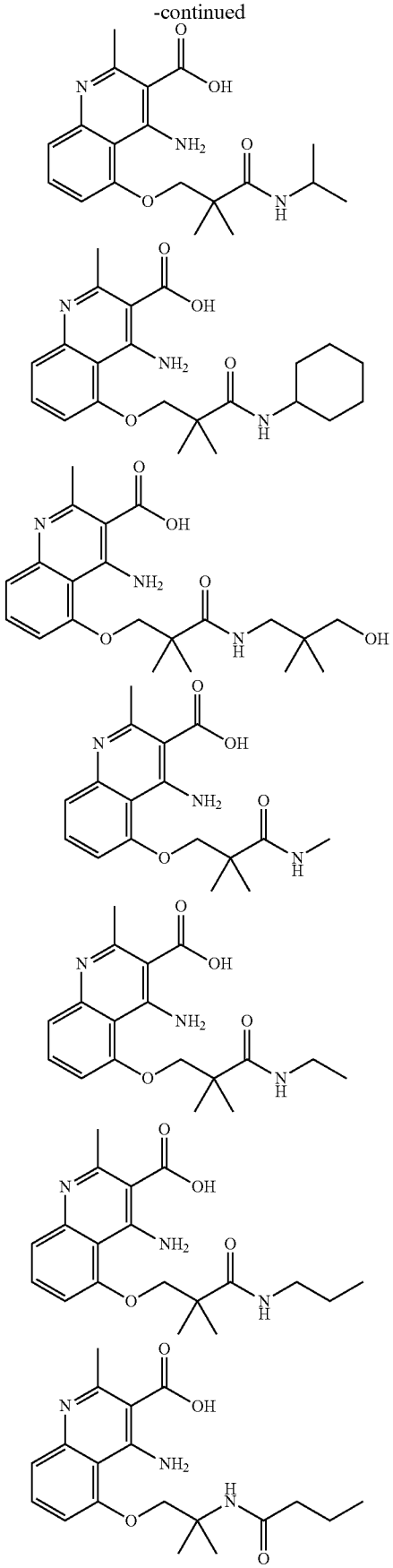
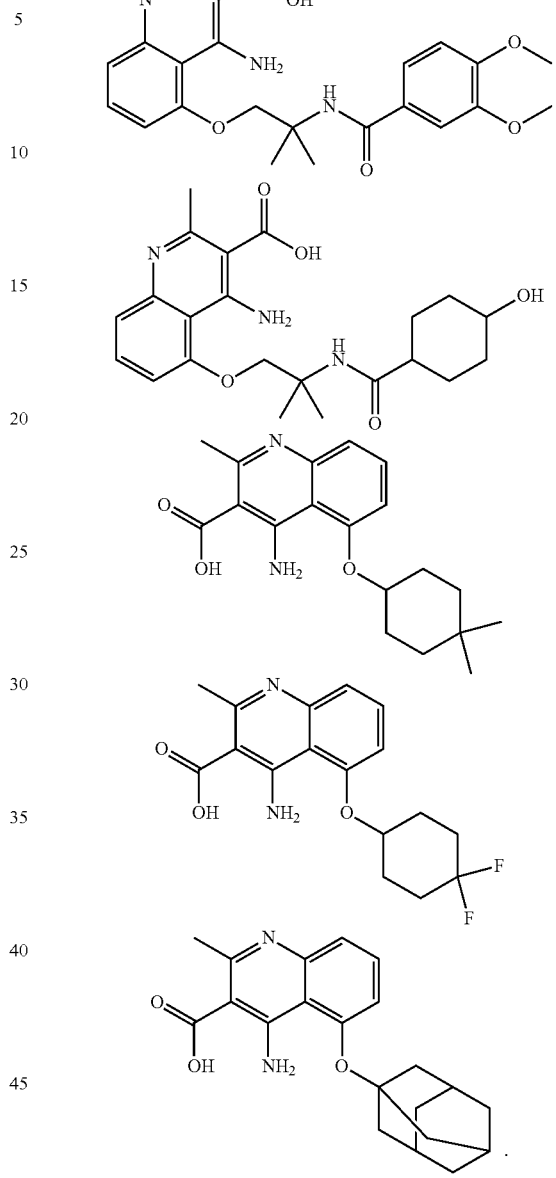
In another embodiment, the sweetness enhancer is a compound of formula (III):
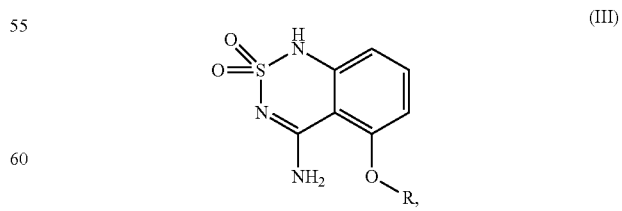
(III)
wherein R is selected from the group consisting of alkyl, substituted alkyl, carbocyclyl, substituted carbocyclyl; aryl, substituted aryl, arylalkyl, substituted arylalkyl, heterocyclyl, substituted heterocyclyl, heteroalkyl, substituted heteroalkyl, heteroaryl, substituted heteroaryl, heteroarylalkyl and substituted heteroarylalkyl. In a more particular embodiment, the compound of formula (III) is present in a concentration of about 50 ppm or less.

In another embodiment, the sweetness enhancer is selected from the group consisting of:

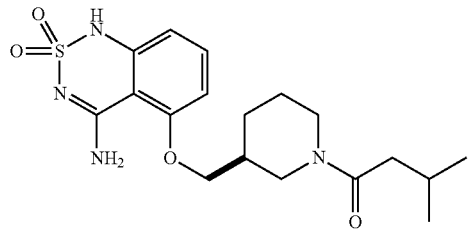

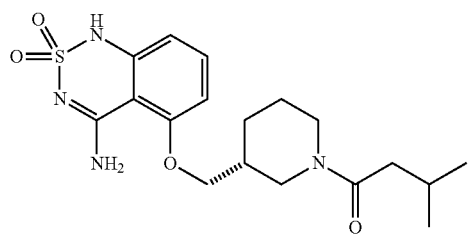

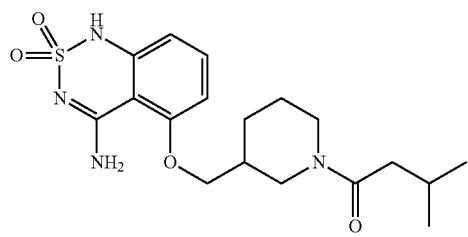

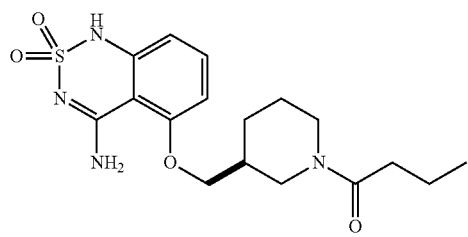

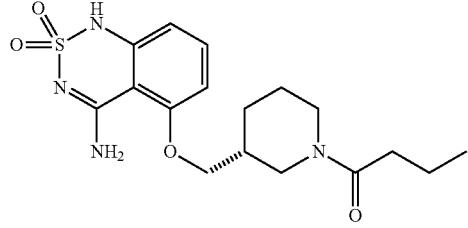

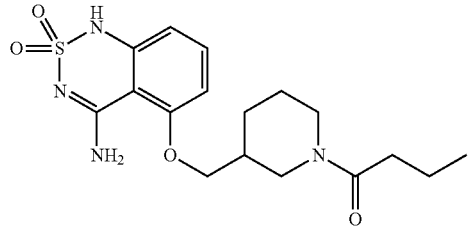

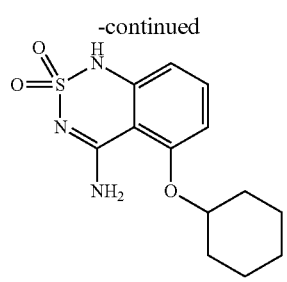

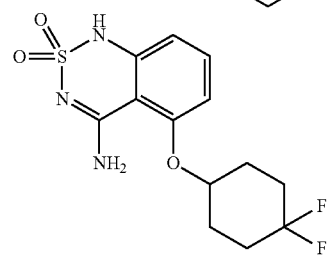

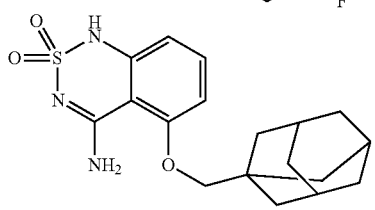

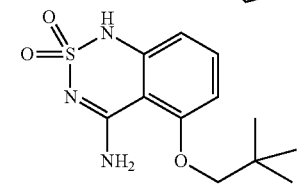

In a particular embodiment, the sweetness enhancer is FEMA GRAS flavor 4701:

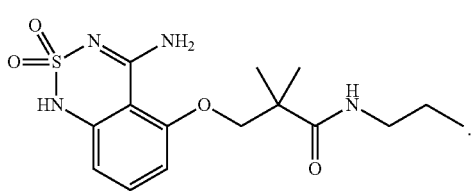

FEMA4701

In a more particular embodiment, FEMA GRAS flavor 4701 can be present in a concentration of about 15 ppm or less.

In a further particular embodiment, the sweetness enhancer is the following compound:

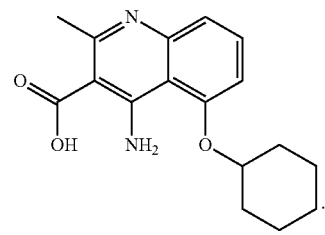 [SMILES: Cc1nc2cccc(OC3CCCCC3)c2c(N)c1C(=O)O]

4-amino-5-(cyclohexyloxy)-2-methylquinoline-3-carboxylic acid

In a more particular embodiment, the sweetness enhancer is a salt of 4-amino-5-(cyclohexyloxy)-2-methylquinoline-3-carboxylic acid. The 4-amino-5-(cyclohexyloxy)-2-methylquinoline-3-carboxylic acid or a salt thereof is present in a concentration of about 30 ppm or less.

In one embodiment, the sweetness enhancer is a compound disclosed in WO2006138512, the contents of which are incorporated by reference herein. In a more particular embodiment, the sweetness enhancer is the following compound:

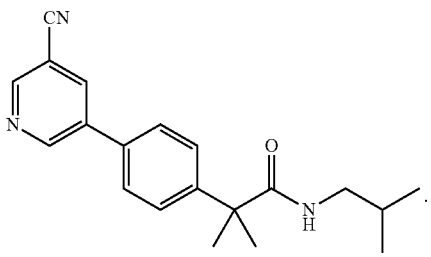 [SMILES: CC(C)CNC(=O)C(C)(C)c1ccc(-c2cncc(C#N)c2)cc1]

2-(4-(5-cyanopyridin-3-yl)phenyl)-N-isobutyl-2-methylpropanamide

In a particular embodiment, 2-(4-(5-cyanopyridin-3-yl)phenyl)-N-isobutyl-2-methylpropanamide is present in a concentration of about 50 ppm or less.

In one embodiment, the sweetness enhancer is a compound disclosed in EP2606747, the contents of which is incorporated by reference herein. In a more particular embodiment, the sweetness enhancer is deoxycholic acid. In an even more particular embodiment, deoxycholic acid is present in a concentration of about 100 ppm or less.

In another embodiment, the sweetness enhancer is a compound disclosed in WO2012107201, the contents of which is incorporated by reference herein. In a particular embodiment, the sweetness enhancer is a citric acid derivative. In an even more particular embodiment, the citric acid derivative is present in a concentration of about 100 ppm or less.

In another embodiment, the sweetness enhancer is a compound disclosed in WO2012107204, the contents of which are incorporated by reference herein. In a particular embodiment, the sweetness enhancer is trans-melilotoside. In an even more particular embodiment, the trans-melilotoside is present in a concentration of about 100 ppm or less.

In another embodiment, the sweetness enhancer is a compound disclosed in US2012201935, the contents of which are incorporated by reference herein. In a particular embodiment, the sweetness enhancer is rosmarinic acid. In an even more particular embodiment, rosmarinic acid is present in a concentration of about 100 ppm or less.

In another embodiment, the sweetness enhancer is a compound disclosed in WO2012107202, the contents of which are incorporated by reference herein. In a particular embodiment, the sweetness enhancer is tormentic acid. In an even more particular embodiment, tormentic acid is present in a concentration of about 100 ppm or less.

In another embodiment, the sweetness enhancer is a compound disclosed in WO2012107206, the contents of which are incorporated by reference herein. In a particular embodiment, the sweetness enhancer is microcarpalide. In an even more particular embodiment, microcarpalide is present in a concentration of about 100 ppm or less.

In another embodiment, the sweetness enhancer is a compound disclosed in WO2012107203, the contents of which are incorporated by reference herein. In a particular embodiment, the sweetness enhancer is nobiletin. In an even more particular embodiment, nobiletin is present in a concentration of about 200 ppm or less.

In another embodiment, the sweetness enhancer is a compound disclosed in WO2012107205, the contents of which are incorporated by reference herein. In a particular embodiment, the sweetness enhancer is the following compound.

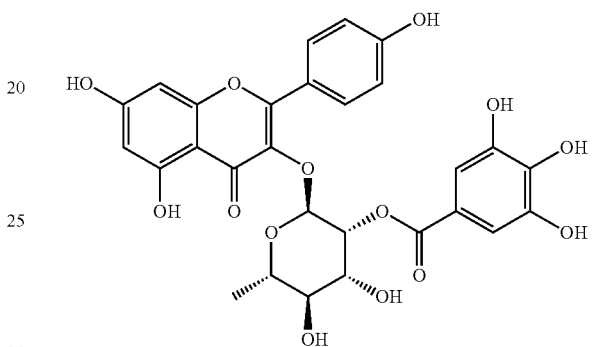

In a particular embodiment, a beverage comprises D-psicose and the sweetness enhancer Rebaudioside C, wherein Rebaudioside C is present in a concentration at or below its sweetness recognition threshold.

In a more particular embodiment, a cola beverage comprises D-psicose and the sweetness enhancer Rebaudioside C, wherein Rebaudioside C is present in a concentration of about 345 ppm or less.

In another particular embodiment, the present invention provides a cola beverage comprising D-psicose and the sweetness enhancer Rebaudioside C, wherein D-psicose is present in an amount of about 0.5% to about 10% by weight and Rebaudioside C is present in a concentration at or below its sweetness recognition threshold.

In a more particular embodiment, the present invention provides a cola beverage comprising D-psicose and the sweetness enhancer Rebaudioside C, wherein D-psicose is present in an amount of about 0.5% to about 10% by weight and Rebaudioside C is present in a concentration of about 345 ppm.

In another embodiment, the present invention provides a cola beverage comprising D-psicose and the sweetness enhancer Rebaudioside C, wherein D-psicose is present in an amount of about 2% by weight and Rebaudioside C is present in a concentration at or below its sweetness recognition threshold concentration.

In another particular embodiment, the present invention provides a cola beverage comprising D-psicose and the sweetness enhancer Rebaudioside C, wherein D-psicose is present in an amount of about 2% by weight and Rebaudioside C is present in a concentration of about 345 ppm.

In another particular embodiment, the present invention provides a beverage comprising a citric acid buffer matrix, D-psicose and the sweetness enhancer Rebaudioside C, wherein Rebaudioside C is present in a concentration of about 220 ppm.

In another embodiment, the present invention provides a lemon-lime carbonated soft drink comprising D-psicose and the sweetness enhancer Rebaudioside C, wherein D-psicose is present in an amount of about 0.5% to about 10% by weight and Rebaudioside C is present in a concentration at or below its sweetness recognition threshold concentration. The lemon-lime carbonated soft drink may have a citric acid buffer beverage matrix, and additionally, lemon-lime flavoring.

In another particular embodiment, the present invention provides a lemon-lime carbonated soft drink comprising D-psicose and the sweetness enhancer Rebaudioside C, wherein D-psicose is present in an amount of about 0.5% to about 10% by weight and Rebaudioside C is present in a concentration of about 220 ppm. The lemon-lime carbonated soft drink may have a citric acid buffer beverage matrix, and additionally, lemon-lime flavoring.

In another embodiment, the present invention provides a lemon-lime carbonated soft drink comprising D-psicose and the sweetness enhancer Rebaudioside C, wherein D-psicose is present in an amount of about 2% by weight and Rebaudioside C is present in a concentration at or below its sweetness recognition threshold concentration. The lemon-lime carbonated soft drink may have a citric acid buffer beverage matrix, and additionally, lemon-lime flavoring.

In another particular embodiment, the present invention provides a lemon-lime carbonated soft drink comprising D-psicose and the sweetness enhancer Rebaudioside C, wherein D-psicose is present in an amount of about 2% by weight and Rebaudioside C is present in a concentration of about 220 ppm. The lemon-lime carbonated soft drink may have a citric acid buffer beverage matrix, and additionally, lemon-lime flavoring.

In a particular embodiment, a beverage comprises D-psicose and the sweetness enhancer 2,4-dihydroxybenzoic acid, wherein 2,4-dihydroxybenzoic acid is present in a concentration at or below its sweetness recognition threshold.

In a more particular embodiment, beverage comprises D-psicose and the sweetness enhancer 2,4-dihydroxybenzoic acid, wherein 2,4-dihydroxybenzoic acid is present in a concentration of about 500 ppm.

In another particular embodiment, a beverage comprises D-psicose and the sweetness enhancer 2,4-dihydroxybenzoic acid, wherein 2,4-dihydroxybenzoic acid is present in a concentration at or below its sweetness recognition threshold and the beverage matrix comprises citric acid buffer.

In a more particular embodiment, a beverage comprises D-psicose and the sweetness enhancer 2,4-dihydroxybenzoic acid, wherein D-psicose is present in an amount of about 0.5% to about 10% by weight, e.g., from about 2% to about 8% by weight, 2,4-dihydroxybenzoic acid is present in a concentration of about 500 ppm and the beverage matrix comprises citric acid buffer.

In a particular embodiment, a beverage comprises D-psicose and the sweetness enhancer FEMA GRAS flavor 4774, wherein FEMA GRAS flavor 4774 is present in a concentration at or below its sweetness recognition threshold.

In a more particular embodiment, a beverage comprises D-psicose and the sweetness enhancer FEMA GRAS flavor 4774, wherein FEMA GRAS flavor 4774 is present in a concentration of about 20 ppm.

In another particular embodiment, a beverage comprises D-psicose and the sweetness enhancer FEMA GRAS flavor 4774, wherein FEMA GRAS flavor 4774 is present in a concentration at or below its sweetness recognition threshold and the beverage matrix comprises citric acid buffer.

In a more particular embodiment, a beverage comprises D-psicose and the sweetness enhancer FEMA GRAS flavor 4774, wherein D-psicose is present in an amount of about 0.5% to about 10% by weight, e.g., from about 2% to about 8% by weight, FEMA GRAS flavor 4774 is present in a concentration of about 20 ppm and the beverage matrix comprises citric acid buffer.

In a particular embodiment, a beverage comprises D-psicose and the sweetness enhancer 4-amino-5-(cyclohexyloxy)-2-methylquinoline-3-carboxylic acid or a salt thereof, wherein 4-amino-5-(cyclohexyloxy)-2-methylquinoline-3-carboxylic acid, or a salt thereof, is present in a concentration at or below its sweetness recognition threshold.

In a more particular embodiment, a beverage comprises D-psicose and the sweetness enhancer 4-amino-5-(cyclohexyloxy)-2-methylquinoline-3-carboxylic acid or a salt thereof, wherein 4-amino-5-(cyclohexyloxy)-2-methylquinoline-3-carboxylic acid, or a salt thereof, is present in a concentration of about 30 ppm.

In another particular embodiment, a beverage comprises D-psicose and the sweetness enhancer 4-amino-5-(cyclohexyloxy)-2-methylquinoline-3-carboxylic acid, wherein 4-amino-5-(cyclohexyloxy)-2-methylquinoline-3-carboxylic acid, or a salt thereof, is present in a concentration at or below its sweetness recognition threshold and the beverage matrix comprises citric acid buffer.

In a more particular embodiment, the present invention provides a beverage comprising D-psicose and the sweetness enhancer 4-amino-5-(cyclohexyloxy)-2-methylquinoline-3-carboxylic acid or a salt thereof, wherein D-psicose is present in an amount of about 0.5% to about 10% by weight, e.g., from about 2% to about 8% by weight, 4-amino-5-(cyclohexyloxy)-2-methylquinoline-3-carboxylic acid or a salt thereof is present in a concentration of about 30 ppm and the beverage matrix comprises citric acid buffer.

The specific beverages provided above can also contain other carbohydrate sweeteners that are not rare sugars.

For example, a beverage comprises D-psicose, sucrose and the sweetness enhancer 4-amino-5-(cyclohexyloxy)-2-methylquinoline-3-carboxylic acid or a salt thereof, wherein 4-amino-5-(cyclohexyloxy)-2-methylquinoline-3-carboxylic acid or a salt thereof is present in a concentration at or below its sweetness recognition threshold.

In another embodiment, the beverage comprises D-psicose, sucrose and the sweetness enhancer 4-amino-5-(cyclohexyloxy)-2-methylquinoline-3-carboxylic acid or a salt thereof, wherein 4-amino-5-(cyclohexyloxy)-2-methylquinoline-3-carboxylic acid or a salt thereof is present in a concentration of about 30 ppm.

In another particular embodiment, a beverage comprises D-psicose, sucrose and the sweetness enhancer 4-amino-5-(cyclohexyloxy)-2-methylquinoline-3-carboxylic acid or a salt thereof, wherein D-psicose is present in an amount from about 0.5% to about 10% by weight, e.g., from about 2% to about 8% by weight, sucrose is present in an amount from about 0.5% to about 10% by weight, e.g., from about 1% to about 8% by weight, 4-amino-5-(cyclohexyloxy)-2-methylquinoline-3-carboxylic acid or a salt thereof is present in a concentration at or below its sweetness recognition threshold and the beverage matrix comprises citric acid buffer.

In a more particular embodiment, a beverage comprises D-psicose, sucrose and the sweetness enhancer 4-amino-5-(cyclohexyloxy)-2-methylquinoline-3-carboxylic acid or a salt thereof, wherein D-psicose is present in an amount from about 0.5% to about 10% by weight, e.g., from about 2% to about 8% by weight, sucrose is present in an amount from about 0.5% to about 10% by weight, e.g., from about 1% to about 8% by weight and 4-amino-5-(cyclohexyloxy)-2-methylquinoline-3-carboxylic acid or a salt thereof is present in a concentration of about 30 ppm, and wherein the beverage matrix comprises citric acid buffer.

In another particular embodiment, a beverage comprises D-tagatose and the sweetness enhancer FEMA GRAS flavor 4701, wherein FEMA GRAS flavor 4701 is present in a concentration at or below its sweetness recognition threshold.

In a more particular embodiment, a beverage comprises D-tagatose and the sweetness enhancer FEMA GRAS flavor 4701, wherein FEMA GRAS FLAVOR 4701 is present in a concentration of about 15 ppm and the beverage matrix comprises citric acid buffer.

It is contemplated that the beverage can include one or more sweetness enhancers. In one embodiment, the beverage can include one sweetness enhancer. In other embodiments, the beverage can include two or more sweetness enhancers. In embodiments where two or more sweetness enhancers are utilized, each sweetness enhancer should be present at or below its respective sweetness recognition threshold concentration The present invention also provides methods for enhancing the sweetness of a beverage. In one embodiment, a method for enhancing the sweetness of a beverage comprises adding a rare sugar and a sweetness enhancer to the beverage, wherein the sweetness enhancer is present in a concentration at or below its sweetness recognition threshold. In one embodiment, the rare sugar is added first to the beverage. In another embodiment, the sweetness enhancer is added first to the beverage. In yet another embodiment, both the rare sugar and the sweetness enhancer are added at the same time to the beverage. The rare sugar can be present in the beverage in an amount from about 0.5% to about 12% by weight. The sweetness enhancer can be present in a concentration from about 1 ppm to about 500 ppm (as long as it is at or below the sweetness recognition threshold concentration).

In another embodiment, a method for enhancing the sweetness of a beverage comprising a rare sugar, comprises (i) providing a beverage comprising a rare sugar; (ii) adding a sweetness enhancer to the beverage in a concentration at or below its sweetness recognition threshold to provide a beverage comprising a rare sugar and a sweetness enhancer.

Addition of the sweetness enhancer at a concentration at or below its sweetness recognition threshold increases the detected sucrose equivalence of a beverage containing one or more rare sugar by an amount more than the detectable sweetness of a solution containing the same concentration of the sweetness enhancer in the absence of any sweeteners. Addition of the sweetness enhancer at a concentration at or below its sweetness recognition threshold to a beverage containing a rare sugar may increase the detected sucrose equivalence by about 0.5% or greater, e.g., the sucrose equivalence is increased by greater than about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, about 2%, about 3%, about 4% or about 5%.

The rare sugar can be any rare sugar provided herein. In particular embodiments, the rare sugar is D-psicose.

The sweetness enhancer can be any sweetness enhancer provided herein. In a particular embodiment, the sweetness enhancer is selected from the group consisting of Rebaudioside C, 2,4-dihydroxybenzoic acid, FEMA GRAS flavor 4701, FEMA GRAS flavor 4774, 4-amino-5-(cyclohexyloxy)-2-methylquinoline-3-carboxylic acid and combinations thereof.

In a particular embodiment, a method for enhancing the sweetness of a beverage comprising D-psicose is provided, comprising adding D-psicose and at least one sweetness enhancer of disclosed above to a beverage, wherein the sweetness enhancer is present in a concentration at or below its sweetness recognition threshold.

The sweetness enhancer can be any sweetness enhancer provided herein. In a particular embodiment, the sweetness enhancer is selected from the group consisting of Rebaudioside C, 2,4-dihydroxybenzoic acid, FEMA GRAS flavor 4701, FEMA GRAS flavor 4774, 4-amino-5-(cyclohexyloxy)-2-methylquinoline-3-carboxylic acid and combinations thereof.

In a particular embodiment, a method for enhancing the sweetness of a beverage comprising D-psicose is provided, comprising providing a beverage comprising D-psicose and adding at least one sweetness enhancer selected from the group consisting of Rebaudioside C, 2,4-dihydroxybenzoic acid, FEMA GRAS flavor 4701, FEMA GRAS flavor 4774, 4-amino-5-(cyclohexyloxy)-2-methylquinoline-3-carboxylic acid and combinations thereof in a concentration at or below its sweetness recognition threshold.

In a particular embodiment, addition of Rebaudioside C at a concentration at or below its sweetness recognition threshold increases the detected sucrose equivalence of a beverage containing D-psicose by an amount more than the detectable sweetness of a solution containing the same concentration of Rebaudioside C in the absence of any sweeteners. For example, addition of Rebaudioside C to a beverage containing D-psicose at a concentration at or below its sweetness recognition threshold may increase the detected sucrose equivalence by about 0.8% or greater, e.g., the sucrose equivalence is increased by greater than about 0.8%, about 0.9%, about 1.0%, about 1.1%, about 1.2%, about 1.3%, about 1.4%, about 1.5%, about 1.6%, about 1.7%, about 1.8%, about 1.9%, about 2%, about 3%, about 4% or about 5%.

In a particular embodiment, addition of Rebaudioside C in a concentration of about 220 ppm to a lemon-lime carbonated soft drink comprising and citric acid buffer and D-psicose in an amount of about 2% by weight increases the detected sucrose equivalence from about 1.2% to about 2.0%.

In another embodiment, addition of 2,4-dihydroxybenzoic acid at a concentration at or below its sweetness recognition threshold increases the detected sucrose equivalence of a beverage containing D-psicose by an amount more than the detectable sweetness of a solution containing the same concentration of 2,4-dihydroxybenzoic acid in the absence of any sweeteners. For example, addition of 2,4-dihydroxybenzoic acid at a concentration at or below its sweetness recognition threshold to a beverage containing D-psicose may increase the detected sucrose equivalence by about 1.0% or greater, e.g., the sucrose equivalence is increased by greater than about 1.0%, about 1.1%, about 1.2%, about 1.3%, about 1.4%, about 1.5%, about 1.6%, about 1.7%, about 1.8%, about 1.9%, about 2%, about 3%, about 4% or about 5%. In a particular embodiment, addition of 2,4-hydroxybenzoic acid at a concentration at or below its sweetness recognition threshold increases the detected sucrose equivalence about 1.5%.

In another embodiment, addition of FEMA GRAS flavor 4774 at a concentration at or below its sweetness recognition threshold increases the detected sucrose equivalence of a beverage containing D-psicose by an amount more than the detectable sweetness of a solution containing the same concentration of FEMA GRAS flavor 4774 in the absence of any sweeteners. For example, addition of FEMA GRAS flavor 4774 at a concentration at or below its sweetness recognition threshold to a beverage containing D-psicose may increase the detected sucrose equivalence by about 1% or greater, e.g., the sucrose equivalence is increased by about 1.0%, about 1.1%, about 1.2%, about 1.3%, about 1.4%, about 1.5%, about 1.6%, about 1.7%, about 1.8%, about 1.9%, about 2.0%, about 3% about 4% or about 5%. In a particular embodiment, addition of FEMA GRAS flavor 4774 at a concentration at or below its sweetness recognition threshold increases the detected sucrose equivalence about 1.0 to about 2.0%.

In another embodiment, addition of 4-amino-5-(cyclohexyloxy)-2-methylquinoline-3-carboxylic acid or a salt thereof at a concentration at or below its sweetness recognition threshold increases the detected sucrose equivalence of a beverage containing D-psicose by an amount more than the detectable sweetness of a solution containing the same concentration of 4-amino-5-(cyclohexyloxy)-2-methylquinoline-3-carboxylic acid or a salt thereof in the absence of any sweeteners. For example, addition of 4-amino-5-(cyclohexyloxy)-2-methylquinoline-3-carboxylic acid or a salt thereof at a concentration at or below its sweetness recognition threshold to a beverage containing D-psicose may increase the detected sucrose equivalence by about 1.0% or greater, i.e., the sucrose equivalence is increased by about 1.0%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 3%, about 3%, about 4% or about 5%. In a particular embodiment, addition of 4-amino-5-(cyclohexyloxy)-2-methylquinoline-3-carboxylic acid or a salt thereof at a concentration at or below its sweetness recognition threshold increases the detected sucrose equivalence about 2.0 to 2.5%.

It has been surprisingly discovered that certain sweetness enhancers can synergistically enhance the sweetness of beverages containing multiple carbohydrate sweeteners, i.e., D-psicose and sucrose. For example, addition of 4-amino-5-(cyclohexyloxy)-2-methylquinoline-3-carboxylic acid at a concentration at or below its sweetness recognition threshold increases the detected sucrose equivalence of a beverage containing D-psicose and sucrose by an amount more than the detectable sweetness of a solution containing the same concentration of 4-amino-5-(cyclohexyloxy)-2-methylquinoline-3-carboxylic acid in the absence of any sweeteners.

Addition of 4-amino-5-(cyclohexyloxy)-2-methylquinoline-3-carboxylic acid at a concentration at or below its sweetness recognition threshold to a beverage containing D-psicose may increase the detected sucrose equivalence from about 1.0% to about 5.0%, such as, for example, about 1.0%, about 1.5%, about 2.0%, about 2.5%, about 3.0%, about 3.5%, about 4.0%, about 4.5% or about 5.0%. In a particular embodiment, addition of 4-amino-5-(cyclohexyloxy)-2-methylquinoline-3-carboxylic acid at a concentration at or below its sweetness recognition threshold increases the detected sucrose equivalence about 5.0%.

In another embodiment, the rare sugar of the present invention is D-tagatose. The sweetness enhancer can be any sweetness enhancer provided herein. In a particular embodiment, the sweetness enhancer is FEMA GRAS flavor 4701.

In a particular embodiment, a method for enhancing the sweetness of a beverage comprising comprises adding D-tagatose and a sweetness enhancer to the beverage, wherein the sweetness enhancer is present in a concentration at or below its sweetness recognition threshold. In one embodiment, D-tagatose is added first to the beverage. In another embodiment, the sweetness enhancer is added first to the beverage. In yet another embodiment, both D-tagatose and the sweetness enhancer are added at the same time to the beverage.

In another embodiment, a method for enhancing the sweetness of a beverage comprising D-tagatose comprises (i) providing a beverage comprising D-tagatose and (ii) adding at least one sweetness enhancer disclosed above of the present invention in a concentration at or below its sweetness recognition threshold. The addition of the at least one sweetness enhancer at a concentration at or below its sweetness recognition threshold increases the detected sucrose equivalence of the beverage compared to a corresponding beverage in the absence of the at least one sweetness enhancer. Moreover, sweetness can be increased by an amount more than the detectable sweetness of a solution containing the same concentration of the at least one sweetness enhancer in the absence of any sweeteners.

In one embodiment, addition of FEMA GRAS FLAVOR 4701 at a concentration at or below its sweetness recognition threshold increases the detected sucrose equivalence of a beverage containing D-tagatose by an amount more than the detectable sweetness of a solution containing the same concentration of FEMA GRAS FLAVOR 4701 in the absence of any sweeteners. For example, addition of FEMA GRAS FLAVOR 4701 at a concentration at or below its sweetness recognition threshold to a beverage containing D-tagatose may increase the detected sucrose equivalence by about 0.5% or more, i.e., the sucrose equivalence may be increased by about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, about 2.0%, about 3%, about 4% or about 5%. In a particular embodiment, addition of FEMA GRAS FLAVOR 4701 at a concentration at or below its sweetness recognition threshold increases the detected sucrose equivalence about 2.0 to 2.5%.

In still another embodiment, the present invention is directed provides a method for making a sweetened beverage comprising adding a rare sugar and a sweetness enhancer to the beverage, wherein the sweetness enhancer is present in a concentration at or below its sweetness recognition threshold. In one embodiment, the rare sugar is added first to the beverage. In another embodiment, the sweetness enhancer is added first to the beverage. In yet another embodiment, both the rare sugar and the sweetness enhancer are added at the same time to the beverage. The rare sugar can be present in the beverage in an amount from about 0.5% to about 12% by weight. The sweetness enhancer can be present in a concentration from about 1 ppm to about 500 ppm (as long as it is at or below the sweetness recognition threshold concentration).

In one embodiment, the beverage is a carbonated or non-carbonated beverage.

Carbonated beverages include, but are not limited to, enhanced sparkling beverages (i.e. carbonated soft drinks), colas, lemon-lime flavored sparkling beverages (i.e. lemon-lime carbonated soft drinks), orange flavored carbonated soft drinks, grape flavored carbonated soft drinks, strawberry flavored carbonated soft drinks, pineapple flavored carbonated soft drinks, ginger-ales, soft drinks and root beers.

Non-carbonated beverages include, but are not limited to fruit juices, fruit-flavored juices, juice drinks, nectars, vegetable juices, vegetable-flavored juices, sports drinks, energy drinks, enhanced water drinks, enhanced water with vitamins, near water drinks (e.g., water with natural or synthetic flavorants), coconut waters, tea type drinks (e.g. black tea, green tea, red tea, oolong tea), coffees, cocoa drinks, beverages containing milk components (e.g. milk beverages, coffee containing milk components, café au lait, milk tea, fruit milk beverages), beverages containing cereal extracts and smoothies.

Beverages comprise a liquid matrix, i.e. the basic ingredient in which the ingredients are dissolved. In one embodiment, a beverage comprises water of beverage quality as the liquid matrix, such as, for example deionized water, distilled water, reverse osmosis water, carbon-treated water, purified water, demineralized water and combinations thereof, can be used. Additional suitable liquid matrices include, but are not limited to, phosphoric acid, citric acid, tartaric acid, lactic acid and buffers comprising such acids. For example, suitable matrices also include phosphoric acid buffer or citric acid buffer.

In one embodiment, the beverage matrix is a citric acid buffer. The citric acid buffer may be prepared from citric acid and sodium citrate and/or potassium citrate.

It is contemplated that the pH of the beverage may be from about 1.8 to about 10. A further example includes a pH range from about 2 to about 5. In a particular embodiment, the pH of the beverage can be from about 2.5 to about 4.2. In a more particular embodiment, the pH of the beverage is about 3.3. One of skill in the art will understand that the pH of the beverage can vary based on the type of beverage. Dairy beverages, for example, can have pHs greater than 4.2.

The titratable acidity of a beverage may, for example, range from about 0.01% to about 1.0% by weight of beverage. In one embodiment, the titratable acidity of the beverage is about 0.195%.

In one embodiment, a beverage with a citric acid buffer matrix has a titratable acidity of about 0.195% (w/w citric acid).

In another embodiment, a lemon-lime carbonated soft drink has titratable acidity of about 0.195% (w/w citric acid).

The carbonation of a sparkling beverage/carbonated soft drink product has 0% to about 2% (w/w) of carbon dioxide or its equivalent, for example, from about 0.1% to about 1.0% (w/w).

The temperature of the beverage may, for example, range from about 4° C. to about 100° C., such as, for example, from about 4° C. to about 25° C.

The beverage can be customized to provide the desired calorie content. For example, a beverage can be "full-calorie", i.e. have about 120 calories per 8 oz serving. Alternatively, a beverage can be "mid-calorie", i.e. have less than about 60 calories per 8 oz serving. In other embodiment, a beverage can be "low-calorie", i.e. have less than 40 calories per 8 oz serving. In still other embodiments, the beverage can be "zero-calorie", i.e. have less than 5 calories per 8 oz. serving.

The sweetness of a given composition is typically measured with reference to a solution of sucrose. See generally "A Systematic Study of Concentration-Response Relationships of Sweeteners," G. E. DuBois, D. E. Walters, S. S. Schiffman, Z. S. Warwick, B. J. Booth, S. D. Pecore, K. Gibes, B. T. Can, and L. M. Brands, in *Sweeteners: Discovery, Molecular Design and Chemoreception*, D. E. Walters, F. T. Orthoefer, and G. E. DuBois, Eds., American Chemical Society, Washington, D.C. (1991), pp 261-276.

The sweetness of a non-sucrose sweetener can be measured against a sucrose reference by determining the non-sucrose sweetener's sucrose equivalence. Typically, taste panelists are trained to detect sweetness of reference sucrose solutions containing between 1-15% sucrose (w/v). Other non-sucrose sweeteners are then tasted at a series of dilutions to determine the concentration of the non-sucrose sweetener that is as sweet as a given percent sucrose reference. For example, if a 1% solution of a sweetener is as sweet as a 10% sucrose solution, then the sweetener is said to be 10 times as potent as sucrose, and has 10% sucrose equivalence.

Beverages Containing Rare Sugars and Natural High Potency Sweeteners

The present invention is also based on the discovery that beverages containing natural high potency sweeteners and rare sugars, wherein the two components are present in particular weight ratios, have improved flavor and temporal profiles, and taste more like sugar-sweetened beverages compared to corresponding beverages containing the same natural high potency in the absence of the rare sugar.

For example, beverages containing greater than 95% pure Rebaudioside A and 2% D-psicose by weight, wherein the natural high potency sweetener and D-psicose are in particular weight ratios, have improved flavor and temporal profiles and are more sugar-like compared to corresponding beverages containing greater than 95% pure Rebaudioside A in the absence of D-psicose.

As used herein, the "sugar-sweetened" characteristics include any characteristic similar to that of beverages containing sucrose and include, but are not limited to, maximal response, flavor profile, temporal profile, adaptation behavior, mouthfeel, concentration/response function, tastant/and flavor/sweet taste interactions, spatial pattern selectivity, and temperature effects.

The flavor profile of a beverage is a quantitative profile of the relative intensities of all of the taste attributes exhibited. Such profiles often are plotted as histograms or radar plots.

These characteristics are dimensions in which the taste of a beverage containing sucrose is different from the tastes of a beverage containing a non-sucrose sweetener(s). Of these, however, the flavor profile and temporal profile are particularly important. In a single tasting of a sweet beverage, differences (1) in the attributes that constitute a beverage's flavor profile and (2) in the rates of sweetness onset and dissipation, which constitute a beverage's temporal profile, between those observed for sucrose and for non-sucrose sweetener compositions can be noted.

Whether or not a beverage has sugar-sweetened characteristics is determined by an expert sensory panel who taste beverages comprising sugar and beverages compositions comprising non-sucrose sweetener compositions, both with and without additives, and provide their impression as to the similarities of the characteristics of the beverages, both with and without additives, with those comprising sugar. A suitable procedure for determining whether a beverage has a more sugar-like taste is described in embodiments described herein below.

In a particular embodiment, a panel of assessors is used to measure the reduction of sweetness linger. Briefly described, a panel of assessors (generally 8 to 12 individuals) is trained to evaluate sweetness perception and measure sweetness at several time points from when the sample is initially taken into the mouth until 3 minutes after it has been expectorated. Using statistical analysis, the results are compared between samples containing additives and samples that do not contain additives. A decrease in score for a time point measured after the sample has cleared the mouth indicates there has been a reduction in sweetness perception.

The panel of assessors may be trained using procedures well known to those of ordinary skill in the art. In a particular embodiment, the panel of assessors may be trained using the Spectrum™ Descriptive Analysis Method (Meilgaard et al, *Sensory Evaluation Techniques*, 3$^{rd}$ edition, Chapter 11). Desirably, the focus of training should be the recognition of and the measure of the basic tastes; specifically, sweet. In order to ensure accuracy and reproducibility of results, each assessor should repeat the measure of the reduction of sweetness linger about three to about five times per sample, taking at least a five minute break between each repetition and/or sample and rinsing well with water to clear the mouth.

Generally, the method of measuring sweetness comprises taking a 10 mL sample into the mouth, holding the sample in the mouth for 5 seconds and gently swirling the sample in the mouth, rating the sweetness intensity perceived at 5 seconds, expectorating the sample (without swallowing following expectorating the sample), rinsing with one mouthful of water (e.g., vigorously moving water in mouth as if with mouth wash) and expectorating the rinse water, rating the sweetness intensity perceived immediately upon expectorating the rinse water, waiting 45 seconds and, while waiting those 45 seconds, identifying the time of maximum perceived sweetness intensity and rating the sweetness intensity at that time (moving the mouth normally and swallowing as needed), rating the sweetness intensity after another 10 seconds, rating the sweetness intensity after another 60 seconds (cumulative 120 seconds after rinse), and rating the sweetness intensity after still another 60 seconds (cumulative 180 seconds after rinse). Between samples take a 5 minute break, rinsing well with water to clear the mouth.

In one embodiment, a beverage comprises from about 0.1% to about 12% of a rare sugar by weight and a natural high potency sweetener selected from Stevioside, Rebaudioside A, Rebaudioside D, Rebaudioside E, Rebaudioside M, Monatin and its salts, Mogroside IV, Mogroside V, brazzein, thaumatin and combinations thereof, wherein the weight ratio of the natural high potency sweetener to D-psicose is from about 1:2 to about 1:3500.

Any of the rare sugars described herein can be used, alone or in combination. In one embodiment, the rare sugar is selected from the group consisting of D-allose, D-psicose, L-ribose, D-tagatose, L-glucose, L-fucose, L-arabinose, D-turanose and combinations thereof. In a particular embodiment, the rare sugar is D-psicose.

The natural high potency sweetener may vary. Suitable high potency sweeteners include, but are not limited to, steviol glycosides, mogrol glycosides, brazzein and thaumatin In one embodiment, the natural high potency sweetener is Stevioside. In a particular embodiment, Stevioside is present as a pure compound (i.e. >99% by weight in a stevia extract or steviol glycoside mixture). In another embodiment, Stevioside is present in high purity in a stevia extract or steviol glycoside mixture. As used herein, "high purity" refers to a compound being present in a given mixture in an amount greater than about 95%.

In one embodiment, the natural high potency sweetener is Rebaudioside A. In a particular embodiment, Rebaudioside A is present as a pure compound. In another embodiment, Rebaudioside A is present in high purity in a stevia extract or steviol glycoside mixture. In a more particular embodiment, Rebaudioside A is about 97% pure.

In another embodiment, the natural high potency sweetener is Rebaudioside D. In a particular embodiment, Rebaudioside D is present as a pure compound. In another embodiment, Rebaudioside D is present in high purity in a stevia extract or steviol glycoside mixture.

In another embodiment, the natural high potency sweetener is Rebaudioside E. In a particular embodiment, Rebaudioside E is present as a pure compound. In another embodiment, Rebaudioside E is present in high purity in a stevia extract or steviol glycoside mixture.

In another embodiment, the natural high potency sweetener is Rebaudioside M (13-[(2-O-β-D-glucopyranosyl-3-O-β-D-glucopyranosyl-β-D-glucopyranosyl)oxy] ent kaur-16-en-19-oic acid[(2-O-β-D-glucopyranosyl-3-O-β-D-glucopyranosyl-β-D-glucopyranosyl) ester]). In a particular embodiment, Rebaudioside M is present as a pure compound. In another embodiment, Rebaudioside M is present in high purity in a stevia extract or steviol glycoside mixture. In a more particular embodiment, Rebaudioside M is about 97% pure. In a further embodiment, Rebaudioside M is greater than about 80% pure.

In another embodiment, the natural high potency sweetener is monatin. In an particular embodiment, monatin is present as a pure compound.

In another embodiment, the natural high potency sweetener is Mogroside IV. In a particular embodiment, Mogroside IV is present as a pure compound. In another embodiment, Mogroside IV is present in high purity in a Mogroside extract or a mixture of mogrosides.

In another embodiment, the natural high potency sweetener is Mogroside V. In a particular embodiment, Mogroside V is present as a pure compound. In another embodiment, Mogroside V is present in high purity in a Mogroside extract or a mixture of mogrosides.

In another embodiment, the natural high potency sweetener is brazzein. In a particular embodiment, brazzein is present as a pure compound.

In another embodiment, the natural high potency sweetener is thaumatin. In a particular embodiment, thaumatin is present as a pure compound.

The weight ratio of natural high potency sweetener to rare sugar has been found to effect the flavor and temporal properties of the beverage. In particular embodiments, the weight ratio of the natural high potency sweetener to rare sugar is from about 1:2 to about 1:5000, such as, for example, about 1:4500, about 1:4000, about 1:3500, about 1:3000, about 1:2500, about 1:2000, about 1:1500, about 1:1000, about 1:800, about 1:700, about 1:600, about 1:500, about 1:400, about 1:300, about 1:200, about 1:100 and about 1:50.

In one embodiment, the natural high potency sweetener is Rebaudioside A and the rare sugar is D-psicose. In a more particular embodiment, the weight ratio of Rebaudioside A to D-psicose is from about 1:2 to about 1:300, more particularly from about 1:10 to about 1:100.

In one embodiment, the beverage is a carbonated or non-carbonated beverage.

Carbonated beverages include, but are not limited to, enhanced sparkling beverages (i.e. carbonated soft drinks), cola, lemon-lime flavored sparkling beverage (i.e. lemon-lime carbonated soft drink), orange flavored carbonated soft drinks, grape flavored s carbonated soft drinks, strawberry flavored carbonated soft drinks, pineapple flavored carbonated soft drinks, ginger-ale, soft drinks and root beer.

In a particular embodiment, the beverage is a lemon-lime carbonated soft drink.

Non-carbonated beverages include, but are not limited to fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, beverage containing milk components (e.g. milk beverages, coffee containing milk components, café au lait, milk tea, fruit milk beverages), beverages containing cereal extracts, smoothies and combinations thereof.

The beverages comprise a liquid matrix, i.e. the basic ingredient in which the ingredients are dissolved. In one embodiment, a beverage comprises water of beverage quality as the liquid matrix, such as, for example deionized water, distilled water, reverse osmosis water, carbon-treated water, purified water, demineralized water and combinations thereof, can be used. Additional suitable liquid matrices include, but are not limited to phosphoric acid, citric acid, tartaric acid, lactic acid and buffers comprising such acids. For example, suitable matrices also include phosphoric acid buffer or citric acid buffer.

In one embodiment, the beverage matrix comprises citric acid and water.

In one embodiment, the present invention provides a beverage comprising a high purity natural high potency sweetener and a rare sugar in an amount from about 0.1% to about 10% by weight, wherein the weight ratio of the natural high potency sweetener to rare sugar is from about 1:2 to about 1:3500.

In a particular embodiment, a beverage comprises high purity Stevioside and from about 0.1% about 2% D-psicose by weight, wherein the weight ratio of Stevioside to D-psicose is from about 1:2 to about 1:800.

In another particular embodiment, a beverage comprises high purity Rebaudioside A and from about 0.1% to about 10% D-psicose by weight, wherein the weight ratio of Rebaudioside A to D-psicose is from about 1:2 to about 1:3500.

In a more particular embodiment, a beverage comprises high purity Rebaudioside A and from about 0.1% to about 5% D-psicose by weight, preferably from about 2% to about 5%, more preferably about 3.5%, wherein the ratio of Rebaudioside A to D-psicose is from about 1:10 to about 1:300. In some embodiments, the beverage further comprises sucrose. The beverage may be a reduced calorie beverage, e.g. a reduced calorie lemon-lime carbonated soft drink.

In another particular embodiment, a beverage comprises high purity Rebaudioside D and from about 0.1% to about 10% D-psicose by weight, wherein the weight ratio of Rebaudioside D to D-psicose is from about 1:2 to about 1:3500.

In another particular embodiment, a beverage comprises high purity Rebaudioside E and from about 0.1% to about 10% D-psicose by weight, wherein the weight ratio of Rebaudioside E to D-psicose is from about 1:2 to about 1:3500.

In another particular embodiment, a beverage comprises high purity Rebaudioside M and from about 0.1% to about 10% D-psicose by weight, wherein the weight ratio of Rebaudioside M to D-psicose is from about 1:2 to about 1:3500.

In a more particular embodiment, a beverage comprises high purity Rebaudioside M and from about 0.1% to about 5% D-psicose by weight, preferably from about 2% to about 5%, more preferably about 2%, wherein the ratio of Rebaudioside M to D-psicose is from about 1:25 to about 1:100, such as, for example, from about 1:30 to about 1:50. In some embodiments, the beverage further comprises sucrose. In some embodiments, the beverage is a reduced calorie beverage, e.g. a reduced calorie lemon-lime carbonated soft drink. In other embodiments, the beverage is a zero-calorie beverage, e.g. a zero-calorie lemon-lime carbonated soft drink.

In another particular embodiment, a beverage comprises high purity Monatin and from about 0.1% to about 10% D-psicose by weight, wherein the weight ratio of Monatin to D-psicose is from about 1:2 to about 1:3500.

In another particular embodiment, a beverage comprises high purity Mogroside IV and from about 0.1% to about 10% D-psicose by weight, wherein the weight ratio of Mogroside IV to D-psicose is from about 1:2 to about 1:3500.

In another particular embodiment, a beverage comprises high purity Mogroside V and from about 0.1% to about 10% D-psicose by weight, wherein the weight ratio of Mogroside V to D-psicose is from about 1:2 to about 1:3500.

In another particular embodiment, a beverage comprises high purity brazzein and from about 0.1% to about 10% D-psicose by weight, wherein the weight ratio of brazzein to D-psicose is from about 1:2 to about 1:3500.

In another particular embodiment, a beverage comprises high purity thaumatin and 0.1-10% D-psicose by weight, wherein the weight ratio of thaumatin to D-psicose is from about 1:2 to about 1:3500.

The concentration of the natural high potency sweetener can vary depending on the identity of the beverage and the desired temporal and flavor properties.

In embodiments wherein the natural high potency sweetener is a steviol glycoside or a mogroside, i.e. Stevioside, Rebaudioside A, Rebaudioside D, Rebaudioside E, Rebaudioside M, Mogroside IV and Mogroside V, the concentration of the high potency sweetener in the beverage can be from about 1 ppm to about 300 ppm, such as, for example, from about 30 ppm to about 250 ppm, from about 20 ppm to about 50 ppm or from about 30 ppm to about 40 ppm.

In embodiments wherein the natural high potency sweetener is Monatin, brazzein or thaumatin, the concentration of the high potency sweetener in the beverage can be from about 1 ppm to about 50 ppm, such as, for example, from about 10 ppm to about 40 ppm or from about 20 ppm to about 30 ppm.

In a particular embodiment, a beverage is provided comprising about 2% D-psicose by weight and from about 1 ppm to about 350 ppm high purity Rebaudioside A, such as, for example, 100 ppm to about 600 ppm, from about 100 ppm to about 500 ppm, from about 200 ppm to about 400 ppm or from about 300 ppm to about 400 ppm. The beverage can be, for example, a lemon-lime carbonated soft drink.

In a more particular embodiment, a zero-calorie beverage is provided comprising 2% D-psicose by weight and about 300-500 ppm high purity Rebaudioside A. The beverage can be, for example, a lemon-lime carbonated soft drink.

In another embodiment, a low-calorie beverage is provided comprising about 1% to about 3.5% D-psicose and about 5-35 ppm high purity Rebaudioside A. The beverage may further comprise a calorie sweetener, e.g. sucrose. The beverage can be, for example, a lemon-lime carbonated soft drink.

In a more particular embodiment, a low-calorie beverage is provided comprising 2% D-psicose by weight and about 30 ppm high purity Rebaudioside A. The beverage can be, for example, a lemon-lime carbonated soft drink.

In another more particular embodiment, a low-calorie beverage is provided comprising 1.2% D-psicose, 7.5 ppm high purity Rebaudioside A and sucrose. The beverage can be, for example, a lemon-lime carbonated soft drink.

In still another more particular embodiment, a low-calorie beverage is provided comprising 3.5 D-psicose, 15 ppm high purity Rebaudioside A and sucrose. The beverage can be, for example, a lemon-lime carbonated soft drink.

In another embodiment, a beverage is provided comprising about 1% to about 3.5% D-psicose and about 25-100 ppm high purity Rebaudioside M. The beverage may further comprise sucrose. The beverage can be, for example, a lemon-lime carbonated soft drink.

In a more particular embodiment, a zero-calorie beverage is provided comprising 2.1% D-psicose by weight and about 50 ppm high purity Rebaudioside A. The beverage can be, for example, a lemon-lime carbonated soft drink.

It is contemplated that the pH of the beverage may be from about 1.8 to about 10. A further example includes a pH range from about 2 to about 5. In a particular embodiment, the pH of beverage can be from about 2.5 to about 4.2. In a more particular embodiment, the pH of the beverage is about 3.3. One of skill in the art will understand that the pH of the beverage can vary based on the type of beverage. Dairy beverages, for example, can have pHs greater than 4.2.

The titratable acidity of a beverage may, for example, range from about 0.01% to about 1.0% by weight of beverage. In one embodiment, the titratable acidity of the beverage is about 0.18% (as citric acid).

The carbonation of a sparkling beverage/carbonated soft drink product has 0% to about 2% (w/w) of carbon dioxide or its equivalent, for example, from about 0.1% to about 1.0% (w/w).

The temperature of a beverage may, for example, range from about 4° C. to about 100° C., such as, for example, from about 4° C. to about 25° C.

The beverage can be customized to provide the desired calorie content. For example, a beverage can be "full-calorie", i.e. have about 120 calories per 8 oz serving. Alternatively, a beverage can be "mid-calorie", i.e. have less than about 60 calories per 8 oz serving. In other embodiment, a beverage can be "low-calorie", i.e. have less than 40 calories per 8 oz serving. In still other embodiments, the beverage can be "zero-calorie", i.e. have less than 5 calories per 8 oz. serving.

Additives

The beverages of the present invention, described above, can optionally include additional additives, detailed herein below. In some embodiments, the beverage contains additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof. In some embodiments, the additives act to improve the temporal and flavor profile of the beverage to provide a beverage with a taste similar to sucrose.

The beverages may further contain a least one additional sweetener. The additional sweetener can be any type of sweetener, for example, a natural, non-natural, or synthetic sweetener. In at least one embodiment, the at least one additional sweetener is chosen from natural sweeteners, synthetic high potency sweeteners or combinations thereof.

For example, the at least one additional sweetener may be a carbohydrate sweetener. Non-limiting examples of suitable carbohydrate sweeteners include sucrose, fructose, glucose, erythritol, maltitol, lactitol, sorbitol, mannitol, xylitol, tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof. D- or L-configurations can be used when applicable.

In other embodiments, the additional sweetener is a carbohydrate sweetener selected from the group consisting of glucose, fructose, sucrose and combinations thereof.

In still other embodiments, the additional sweetener can be a natural high potency sweetener. Suitable natural high potency sweeteners include, but are not limited to, rebaudioside A, rebaudioside B, rebaudioside C, rebaudioside D, rebaudioside E, rebaudioside F, rebaudioside I, rebaudioside H, rebaudioside L, rebaudioside K, rebaudioside J, rebaudioside N, rebaudioside O, rebaudioside M, dulcoside A, dulcoside B, rubusoside, stevia, stevioside, mogroside IV, mogroside V, Luo Han Guo, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I. The natural high potency sweetener can be provided as a pure compound or, alternatively, as part of an extract.

In still other embodiments, the additional sweetener can be chemically or enzymatically modified natural high potency sweetener. Modified natural high potency sweeteners include glycosylated natural high potency sweetener such as glucosyl-, galactosyl-, fructosyl-derivatives containing 1-50 glycosidic residues. Glycosylated natural high potency sweeteners may be prepared by enzymatic transglycosylation reaction catalyzed by various enzymes possessing transglycosylating activity.

In yet other embodiments, the at least one additional sweetener is a synthetic sweetener. As used herein, the phrase "synthetic sweetener" refers to any composition which is not found naturally in nature and characteristically has a sweetness potency greater than sucrose, fructose, or glucose, yet has less calories. Non-limiting examples of synthetic high-potency sweeteners suitable for embodiments of this disclosure include sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof.

In one embodiment, the beverage contains one or more polyols. The term "polyol", as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include erythritol, maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect the taste of the beverage.

In certain embodiments, the polyol is present in the beverage in a concentration from about 100 ppm to about 250,000 ppm. In other embodiments, the polyol is present in the beverage in a concentration from about 400 ppm to about 80,000 ppm, such as, for example, from about 5,000 ppm to about 40,000 ppm.

Suitable amino acid additives include, but are not limited to, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid (α, β, and/or δ-isomers), glutamine, hydroxyproline, taurine, norvaline, sarcosine, and their salt forms such as sodium or potassium salts or acid salts. The amino acid additives also may be in the D- or L-configuration and in the mono-, di-, or tri-form of the same or different amino acids. Additionally, the amino acids may be α-, β-, γ- and/or δ-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-α-lysine or poly-L-ε-lysine), poly-L-ornithine (e.g., poly-L-α-ornithine or poly-L-ε-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be α-, β-, γ-, δ-, and ε-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-α-lysine with a MW of 1,500, MW of 6,000, MW of 25,200, MW of 63,000, MW of 83,000, or MW of 300,000.

In particular embodiments, the amino acid is present in the beverage in a concentration from about 10 ppm to about 50,000 ppm. In another embodiment, the amino acid is present in the beverage in a concentration from about 1,000 ppm to about 10,000 ppm, such as, for example, from about 2,500 ppm to about 5,000 ppm or from about 250 ppm to about 7,500 ppm.

Suitable sugar acid additives include, but are not limited to, aldonic, uronic, aldaric, alginic, gluconic, glucuronic, glucaric, galactaric, galacturonic, and salts thereof (e.g., sodium, potassium, calcium, magnesium salts or other physiologically acceptable salts), and combinations thereof.

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, uracil).

The nucleotide is present in the beverage in a concentration from about 5 ppm to about 1,000 ppm.

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

Suitable organic acid additive salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), sorbic acid and adipic acid. The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato.

In particular embodiments, the organic acid additive is present in the beverage in a concentration from about 10 ppm to about 5,000 ppm.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

The inorganic acid additive is present in the beverage in a concentration from about 25 ppm to about 25,000 ppm.

Suitable bitter compound additives include, but are not limited to, caffeine, quinine, urea, bitter orange oil, naringin, quassia, and salts thereof.

The bitter compound is present in the beverage in a concentration from about 25 ppm to about 25,000 ppm.

Suitable flavorant and flavoring ingredient additives for include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring ingredient" are synonymous and can include natural or synthetic substances or combinations thereof. Flavorants also include any other substance which imparts flavor and may include natural or non-natural (synthetic) substances which are safe for human or animals when used in a generally accepted range. Non-limiting examples of proprietary flavorants include Döhler™ Natural Flavoring Sweetness Enhancer K14323 (Döhler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, N.J., U.S.A.), and Sucramask™ (Creative Research Management, Stockton, Calif., U.S.A.).

The flavorant is present in the beverage in a concentration from about 0.1 ppm to about 4,000 ppm.

Suitable polymer additives include, but are not limited to, chitosan, pectin, pectic, pectinic, polyuronic, polygalacturonic acid, starch, food hydrocolloid or crude extracts thereof (e.g., gum acacia senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

The polymer is present in the beverage in a concentration from about 30 ppm to about 2,000 ppm.

Suitable protein or protein hydrolysate additives include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

The protein hydrosylate is present in the beverage in a concentration from about 200 ppm to about 50,000 ppm.

Suitable surfactant additives include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

The surfactant additive is present in the beverage in a concentration from about 30 ppm to about 2,000 ppm.

Suitable flavonoid additives are classified as flavonols, flavones, flavanones, flavan-3-ols, isoflavones, or anthocyanidins. Non-limiting examples of flavonoid additives include, but are not limited to, catechins (e.g., green tea extracts such as Polyphenon™ 60, Polyphenon™ 30, and Polyphenon™ 25 (Mitsui Norin Co., Ltd., Japan), polyphenols, rutins (e.g., enzyme modified rutin Sanmelin™ AO (San-fi Gen F.F.I., Inc., Osaka, Japan)), neohesperidin, naringin, neohesperidin dihydrochalcone, and the like.

The flavonoid additive is present in the beverage in a concentration from about 0.1 ppm to about 1,000 ppm.

Suitable alcohol additives include, but are not limited to, ethanol. In particular embodiments, the alcohol additive is present in the beverage in a concentration from about 625 ppm to about 10,000 ppm.

Suitable astringent compound additives include, but are not limited to, tannic acid, europium chloride ($EuCl_3$), gadolinium chloride ($GdCl_3$), terbium chloride ($TbCl_3$), alum, tannic acid, and polyphenols (e.g., tea polyphenols).

The astringent additive is present in the beverage in a concentration from about 10 ppm to about 5,000 ppm.

Functional Ingredients

The beverage can also contain one or more functional ingredients, which provide a real or perceived heath benefit to the composition. Functional ingredients include, but are not limited to, saponins, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof.

Saponin

In certain embodiments, the functional ingredient is at least one saponin. As used herein, the at least one saponin may comprise a single saponin or a plurality of saponins as a functional ingredient for the beverages provided herein. Generally, according to particular embodiments of this invention, the at least one saponin is present in the beverage in a concentration sufficient to promote health and wellness.

Saponins are glycosidic natural plant products comprising an aglycone ring structure and one or more sugar moieties. The combination of the nonpolar aglycone and the water soluble sugar moiety gives saponins surfactant properties, which allow them to form a foam when shaken in an aqueous solution.

The saponins are grouped together based on several common properties. In particular, saponins are surfactants which display hemolytic activity and form complexes with cholesterol. Although saponins share these properties, they are structurally diverse. The types of aglycone ring structures forming the ring structure in saponins can vary greatly. Non-limiting examples of the types of aglycone ring structures in saponin for use in particular embodiments of the invention include steroids, triterpenoids, and steroidal alkaloids. Non-limiting examples of specific aglycone ring structures for use in particular embodiments of the invention include soyasapogenol A, soyasapogenol B and soyasopogenol E. The number and type of sugar moieties attached to the aglycone ring structure can also vary greatly. Non-limiting examples of sugar moieties for use in particular embodiments of the invention include glucose, galactose, glucuronic acid, xylose, rhamnose, and methylpentose moieties. Non-limiting examples of specific saponins for use in particular embodiments of the invention include group A acetyl saponin, group B acetyl saponin, and group E acetyl saponin.

Saponins can be found in a large variety of plants and plant products, and are especially prevalent in plant skins and barks where they form a waxy protective coating. Several common sources of saponins include soybeans, which have approximately 5% saponin content by dry weight, soapwort plants (Saponaria), the root of which was used historically as soap, as well as alfalfa, aloe, asparagus, grapes, chickpeas, yucca, and various other beans and weeds. Saponins may be obtained from these sources by using extraction techniques well known to those of ordinary skill in the art. A description of conventional extraction techniques can be found in U.S. Pat. Appl. No. 2005/0123662, the disclosure of which is expressly incorporated by reference.

Antioxidant

In certain embodiments, the functional ingredient is at least one antioxidant. As used herein, the at least one antioxidant may comprise a single antioxidant or a plurality of antioxidants as a functional ingredient for the beverages provided herein. Generally, according to particular embodiments of this invention, the at least one antioxidant is present in the beverage in a concentration sufficient to promote health and wellness.

As used herein "antioxidant" refers to any substance which inhibits, suppresses, or reduces oxidative damage to cells and biomolecules. Without being bound by theory, it is believed that antioxidants inhibit, suppress, or reduce oxidative damage to cells or biomolecules by stabilizing free radicals before they can cause harmful reactions. As such, antioxidants may prevent or postpone the onset of some degenerative diseases.

Examples of suitable antioxidants for embodiments of this invention include, but are not limited to, vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, and combinations thereof. In some embodiments, the antioxidant is vitamin A, vitamin C, vitamin E, ubiquinone, mineral selenium, manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone phytoestrogens, genistein, daidzein, glycitein, anythocyanins, cyaniding, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-α-lipoic acid, N-acetylcysteine, emblicanin, apple extract, apple skin extract (applephenon), rooibos extract red, rooibos extract, green, hawthorn berry extract, red raspberry extract, green coffee antioxidant (GCA), aronia extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, wolfberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. In alternate embodiments, the antioxidant is a synthetic antioxidant such as butylated hydroxytolune or butylated hydroxyanisole, for example. Other sources of suitable antioxidants for embodiments of this invention include, but are not limited to, fruits, vegetables, tea, cocoa, chocolate, spices, herbs, rice, organ meats from livestock, yeast, whole grains, or cereal grains.

Particular antioxidants belong to the class of phytonutrients called polyphenols (also known as "polyphenolics"), which are a group of chemical substances found in plants, characterized by the presence of more than one phenol group per molecule. A variety of health benefits may be derived from polyphenols, including prevention of cancer, heart disease, and chronic inflammatory disease and improved mental strength and physical strength, for example. Suitable polyphenols for embodiments of this invention, include catechins, proanthocyanidins, procyanidins, anthocyanins, quercerin, rutin, reservatrol, isoflavones, curcumin, punicalagin, ellagitannin, hesperidin, naringin, citrus flavonoids, chlorogenic acid, other similar materials, and combinations thereof.

In particular embodiments, the antioxidant is a catechin such as, for example, epigallocatechin gallate (EGCG). Suitable sources of catechins for embodiments of this invention include, but are not limited to, green tea, white tea, black tea, oolong tea, chocolate, cocoa, red wine, grape seed, red grape skin, purple grape skin, red grape juice, purple grape juice, berries, pycnogenol, and red apple peel.

In some embodiments, the antioxidant is chosen from proanthocyanidins, procyanidins or combinations thereof. Suitable sources of proanthocyanidins and procyanidins for embodiments of this invention include, but are not limited to, red grapes, purple grapes, cocoa, chocolate, grape seeds, red wine, cacao beans, cranberry, apple peel, plum, blueberry, black currants, choke berry, green tea, sorghum, cinnamon, barley, red kidney bean, pinto bean, hops, almonds, hazelnuts, pecans, pistachio, pycnogenol, and colorful berries.

In particular embodiments, the antioxidant is an anthocyanin. Suitable sources of anthocyanins for embodiments of this invention include, but are not limited to, red berries, blueberries, bilberry, cranberry, raspberry, cherry, pomegranate, strawberry, elderberry, choke berry, red grape skin, purple grape skin, grape seed, red wine, black currant, red currant, cocoa, plum, apple peel, peach, red pear, red cabbage, red onion, red orange, and blackberries.

In some embodiments, the antioxidant is chosen from quercetin, rutin or combinations thereof. Suitable sources of quercetin and rutin for embodiments of this invention include, but are not limited to, red apples, onions, kale, bog whortleberry, lingonberrys, chokeberry, cranberry, blackberry, blueberry, strawberry, raspberry, black currant, green tea, black tea, plum, apricot, parsley, leek, broccoli, chili pepper, berry wine, and ginkgo.

In some embodiments, the antioxidant is resveratrol. Suitable sources of resveratrol for embodiments of this invention include, but are not limited to, red grapes, peanuts, cranberry, blueberry, bilberry, mulberry, Japanese Itadori tea, and red wine.

In particular embodiments, the antioxidant is an isoflavone. Suitable sources of isoflavones for embodiments of this invention include, but are not limited to, soy beans, soy products, legumes, alfalfa spouts, chickpeas, peanuts, and red clover.

In some embodiments, the antioxidant is curcumin. Suitable sources of curcumin for embodiments of this invention include, but are not limited to, turmeric and mustard.

In particular embodiments, the antioxidant is chosen from punicalagin, ellagitannin or combinations thereof. Suitable sources of punicalagin and ellagitannin for embodiments of this invention include, but are not limited to, pomegranate, raspberry, strawberry, walnut, and oak-aged red wine.

In some embodiments, the antioxidant is a citrus flavonoid, such as hesperidin or naringin. Suitable sources of citrus flavonids, such as hesperidin or naringin, for embodiments of this invention include, but are not limited to, oranges, grapefruits, and citrus juices.

In particular embodiments, the antioxidant is chlorogenic acid. Suitable sources of chlorogenic acid for embodiments of this invention include, but are not limited to, green coffee, yerba mate, red wine, grape seed, red grape skin, purple grape skin, red grape juice, purple grape juice, apple juice, cranberry, pomegranate, blueberry, strawberry, sunflower, Echinacea, pycnogenol, and apple peel.

Dietary Fiber

In certain embodiments, the functional ingredient is at least one dietary fiber source.

As used herein, the at least one dietary fiber source may comprise a single dietary fiber source or a plurality of dietary fiber sources as a functional ingredient for the beverages provided herein. Generally, according to particular embodiments of this invention, the at least one dietary fiber source is present in the beverage in a concentration sufficient to promote health and wellness.

Numerous polymeric carbohydrates having significantly different structures in both composition and linkages fall within the definition of dietary fiber. Such compounds are well known to those skilled in the art, non-limiting examples of which include non-starch polysaccharides, lignin, cellulose, methylcellulose, the hemicelluloses, $\beta$-glucans, pectins, gums, mucilage, waxes, inulins, oligosaccharides, fructooligosaccharides, cyclodextrins, chitins, and combinations thereof.

Polysaccharides are complex carbohydrates composed of monosaccharides joined by glycosidic linkages. Non-starch polysaccharides are bonded with $\beta$-linkages, which humans are unable to digest due to a lack of an enzyme to break the $\beta$-linkages. Conversely, digestable starch polysaccharides generally comprise $\alpha(1-4)$ linkages.

Lignin is a large, highly branched and cross-linked polymer based on oxygenated phenylpropane units. Cellulose is a linear polymer of glucose molecules joined by a $\beta(1-4)$ linkage, which mammalian amylases are unable to hydrolyze. Methylcellulose is a methyl ester of cellulose that is often used in foodstuffs as a thickener, and emulsifier. It is commercially available (e.g., Citrucel by GlaxoSmithKline, Celevac by Shire Pharmaceuticals). Hemicelluloses are highly branched polymers consisting mainly of glucurono- and 4-O-methylglucuroxylans. $\beta$-Glucans are mixed-linkage (1-3), (1-4) $\beta$-D-glucose polymers found primarily in cereals, such as oats and barley. Pectins, such as beta pectin, are a group of polysaccharides composed primarily of D-galacturonic acid, which is methoxylated to variable degrees.

Gums and mucilages represent a broad array of different branched structures. Guar gum, derived from the ground endosperm of the guar seed, is a galactomannan. Guar gum is commercially available (e.g., Benefiber by Novartis AG). Other gums, such as gum arabic and pectins, have still different structures. Still other gums include xanthan gum, gellan gum, tara gum, psyllium seed husk gum, and locust been gum.

Waxes are esters of ethylene glycol and two fatty acids, generally occurring as a hydrophobic liquid that is insoluble in water.

Inulins comprise naturally occurring oligosaccharides belonging to a class of carbohydrates known as fructans. They generally are comprised of fructose units joined by $\beta(2-1)$ glycosidic linkages with a terminal glucose unit. Oligosaccharides are saccharide polymers containing typically three to six component sugars. They are generally found either O- or N-linked to compatible amino acid side chains in proteins or to lipid molecules. Fructooligosaccharides are oligosaccharides consisting of short chains of fructose molecules.

Food sources of dietary fiber include, but are not limited to, grains, legumes, fruits, and vegetables. Grains providing dietary fiber include, but are not limited to, oats, rye, barley, wheat. Legumes providing fiber include, but are not limited to, peas and beans such as soybeans. Fruits and vegetables providing a source of fiber include, but are not limited to, apples, oranges, pears, bananas, berries, tomatoes, green beans, broccoli, cauliflower, carrots, potatoes, celery. Plant foods such as bran, nuts, and seeds (such as flax seeds) are also sources of dietary fiber. Parts of plants providing dietary fiber include, but are not limited to, the stems, roots, leaves, seeds, pulp, and skin.

Although dietary fiber generally is derived from plant sources, indigestible animal products such as chitins are also classified as dietary fiber. Chitin is a polysaccharide composed of units of acetylglucosamine joined by $\beta(1-4)$ linkages, similar to the linkages of cellulose.

Sources of dietary fiber often are divided into categories of soluble and insoluble fiber based on their solubility in water. Both soluble and insoluble fibers are found in plant foods to varying degrees depending upon the characteristics of the plant. Although insoluble in water, insoluble fiber has passive hydrophilic properties that help increase bulk, soften stools, and shorten transit time of fecal solids through the intestinal tract.

Unlike insoluble fiber, soluble fiber readily dissolves in water. Soluble fiber undergoes active metabolic processing via fermentation in the colon, increasing the colonic microflora and thereby increasing the mass of fecal solids. Fermentation of fibers by colonic bacteria also yields end-products with significant health benefits. For example, fermentation of the food masses produces gases and short-chain fatty acids. Acids produced during fermentation include butyric, acetic, propionic, and valeric acids that have various beneficial properties such as stabilizing blood glucose levels by acting on pancreatic insulin release and providing liver control by glycogen breakdown. In addition, fiber fermentation may reduce atherosclerosis by lowering cholesterol synthesis by the liver and reducing blood levels of LDL and triglycerides. The acids produced during fermentation lower colonic pH, thereby protecting the colon lining from cancer polyp formation. The lower colonic pH also increases mineral absorption, improves the barrier properties of the colonic mucosal layer, and inhibits inflammatory and adhesion irritants. Fermentation of fibers also may benefit the immune system by stimulating production of T-helper cells, antibodies, leukocytes, splenocytes, cytokinins and lymphocytes.

Fatty Acid

In certain embodiments, the functional ingredient is at least one fatty acid.

As used herein, the at least one fatty acid may be single fatty acid or a plurality of fatty acids as a functional ingredient for the sweetener beverages provided herein. Generally, according to particular embodiments of this invention, the at least one fatty acid is present in the beverage in a concentration sufficient to promote health and wellness.

As used herein, "fatty acid" refers to any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. As used herein, "long chain polyunsaturated fatty acid" refers to any polyunsaturated carboxylic acid or organic acid with a long aliphatic tail. As used herein, "omega-3 fatty acid" refers to any polyunsaturated fatty acid having a first double bond as the third carbon-carbon bond from the terminal methyl end of its carbon chain. In particular embodiments, the omega-3 fatty acid may comprise a long chain omega-3 fatty acid. As used herein, "omega-6 fatty acid" any polyunsaturated fatty acid having a first double bond as the sixth carbon-carbon bond from the terminal methyl end of its carbon chain.

Suitable omega-3 fatty acids for use in embodiments of the present invention can be derived from algae, fish, animals, plants, or combinations thereof, for example. Examples of suitable omega-3 fatty acids include, but are not limited to, linolenic acid, alpha-linolenic acid, eicosapentaenoic acid, docosahexaenoic acid, stearidonic acid, eicosatetraenoic acid and combinations thereof. In some embodiments, suitable omega-3 fatty acids can be provided in fish oils, (e.g., menhaden oil, tuna oil, salmon oil, bonito oil, and cod oil), microalgae omega-3 oils or combinations thereof. In particular embodiments, suitable omega-3 fatty acids may be derived from commercially available omega-3 fatty acid oils such as Microalgae DHA oil (from Martek, Columbia, Md.), OmegaPure (from Omega Protein, Houston, Tex.), Marinol C-38 (from Lipid Nutrition, Channahon, Ill.), Bonito oil and MEG-3 (from Ocean Nutrition, Dartmouth, NS), Evogel (from Symrise, Holzminden, Germany), Marine Oil, from tuna or salmon (from Arista Wilton, Conn.), OmegaSource 2000, Marine Oil, from menhaden and Marine Oil, from cod (from OmegaSource, RTP, NC).

Suitable omega-6 fatty acids include, but are not limited to, linoleic acid, gamma-linolenic acid, dihommo-gamma-linolenic acid, arachidonic acid, eicosadienoic acid, docosadienoic acid, adrenic acid, docosapentaenoic acid and combinations thereof.

Suitable esterified fatty acids for embodiments of the present invention may include, but are not limited to, monoacylglycerols containing omega-3 and/or omega-6 fatty acids, diacylglycerols containing omega-3 and/or omega-6 fatty acids, or triacylglycerols containing omega-3 and/or omega-6 fatty acids and combinations thereof.

Vitamin

In certain embodiments, the functional ingredient is at least one vitamin. As used herein, the at least one vitamin may be single vitamin or a plurality of vitamins as a functional ingredient for the beverages provided herein. Generally, according to particular embodiments of this invention, the at least one vitamin is present in the beverage in a concentration sufficient to promote health and wellness.

Vitamins are organic compounds that the human body needs in small quantities for normal functioning. The body uses vitamins without breaking them down, unlike other nutrients such as carbohydrates and proteins. To date, thirteen vitamins have been recognized, and one or more can be used in the functional sweetener and sweetened compositions herein. Suitable vitamins include, vitamin A, vitamin D, vitamin E, vitamin K, vitamin B1, vitamin B2, vitamin B3, vitamin B5, vitamin B6, vitamin B7, vitamin B9, vitamin B12, and vitamin C. Many of vitamins also have alternative chemical names, non-limiting examples of which are provided below.

| Vitamin | Alternative names |
| --- | --- |
| Vitamin A | Retinol |
|  | Retinaldehyde |
|  | Retinoic acid |
|  | Retinoids |
|  | Retinal |
|  | Retinoic ester |
| Vitamin D | Calciferol |
| (vitamins D1-D5) | Cholecalciferol |
|  | Lumisterol |
|  | Ergocalciferol |
|  | Dihydrotachysterol |
|  | 7-dehydrocholesterol |
| Vitamin E | Tocopherol |
|  | Tocotrienol |
| Vitamin K | Phylloquinone |
|  | Naphthoquinone |
| Vitamin B1 | Thiamin |
| Vitamin B2 | Riboflavin |
|  | Vitamin G |
| Vitamin B3 | Niacin |
|  | Nicotinic acid |
|  | Vitamin PP |
| Vitamin B5 | Pantothenic acid |
| Vitamin B6 | Pyridoxine |
|  | Pyridoxal |
|  | Pyridoxamine |
| Vitamin B7 | Biotin |
|  | Vitamin H |
| Vitamin B9 | Folic acid |
|  | Folate |
|  | Folacin |
|  | Vitamin M |
|  | Pteroyl-L-glutamic acid |

-continued

| Vitamin | Alternative names |
|---|---|
| Vitamin B12 | Cobalamin |
| | Cyanocobalamin |
| Vitamin C | Ascorbic acid |

Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methyl-methionine. As used herein, the term vitamin includes pseudo-vitamins.

In some embodiments, the vitamin is a fat-soluble vitamin chosen from vitamin A, D, E, K and combinations thereof.

In other embodiments, the vitamin is a water-soluble vitamin chosen from vitamin B1, vitamin B2, vitamin B3, vitamin B6, vitamin B12, folic acid, biotin, pantothenic acid, vitamin C and combinations thereof.

Glucosamine

In certain embodiments, the functional ingredient is glucosamine. Generally, according to particular embodiments of this invention, glucosamine is present in the beverage in a concentration sufficient to promote health and wellness.

Glucosamine, also called chitosamine, is an amino sugar that is believed to be an important precursor in the biochemical synthesis of glycosylated proteins and lipids. D-glucosamine occurs naturally in the cartilage in the form of glucosamine-6-phosphate, which is synthesized from fructose-6-phosphate and glutamine. However, glucosamine also is available in other forms, non-limiting examples of which include glucosamine hydrochloride, glucosamine sulfate, N-acetyl-glucosamine, or any other salt forms or combinations thereof. Glucosamine may be obtained by acid hydrolysis of the shells of lobsters, crabs, shrimps, or prawns using methods well known to those of ordinary skill in the art. In a particular embodiment, glucosamine may be derived from fungal biomass containing chitin, as described in U.S. Patent Publication No. 2006/0172392.

The beverage can further comprise chondroitin sulfate.

Mineral

In certain embodiments, the functional ingredient is at least one mineral.

As used herein, the at least one mineral may be single mineral or a plurality of minerals as a functional ingredient for the beverages provided herein. Generally, according to particular embodiments of this invention, the at least one mineral is present in the beverage in a concentration sufficient to promote health and wellness.

Minerals, in accordance with the teachings of this invention, comprise inorganic chemical elements required by living organisms. Minerals are comprised of a broad range of compositions (e.g., elements, simple salts, and complex silicates) and also vary broadly in crystalline structure. They may naturally occur in foods and beverages, may be added as a supplement, or may be consumed or administered separately from foods or beverages.

Minerals may be categorized as either bulk minerals, which are required in relatively large amounts, or trace minerals, which are required in relatively small amounts. Bulk minerals generally are required in amounts greater than or equal to about 100 mg per day and trace minerals are those that are required in amounts less than about 100 mg per day.

In particular embodiments of this invention, the mineral is chosen from bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, and iodine. Although iodine generally is classified as a trace mineral, it is required in larger quantities than other trace minerals and often is categorized as a bulk mineral.

In other particular embodiments of this invention, the mineral is a trace mineral, believed to be necessary for human nutrition, non-limiting examples of which include bismuth, boron, lithium, nickel, rubidium, silicon, strontium, tellurium, tin, titanium, tungsten, and vanadium.

The minerals embodied herein may be in any form known to those of ordinary skill in the art. For example, in a particular embodiment the minerals may be in their ionic form, having either a positive or negative charge. In another particular embodiment the minerals may be in their molecular form. For example, sulfur and phosphorous often are found naturally as sulfates, sulfides, and phosphates.

Preservative

In certain embodiments, the functional ingredient is at least one preservative. As used herein, the at least one preservative may be single preservative or a plurality of preservatives as a functional ingredient for the beverages provided herein. Generally, according to particular embodiments of this invention, the at least one preservative is present in the beverage in a concentration sufficient to promote health and wellness.

In particular embodiments of this invention, the preservative is chosen from antimicrobials, antioxidants, antienzymatics or combinations thereof. Non-limiting examples of antimicrobials include sulfites, propionates, benzoates, sorbates, nitrates, nitrites, bacteriocins, salts, sugars, acetic acid, dimethyl dicarbonate (DMDC), ethanol, and ozone.

According to a particular embodiment, the preservative is a sulfite. Sulfites include, but are not limited to, sulfur dioxide, sodium bisulfite, and potassium hydrogen sulfite.

According to another particular embodiment, the preservative is a propionate. Propionates include, but are not limited to, propionic acid, calcium propionate, and sodium propionate.

According to yet another particular embodiment, the preservative is a benzoate. Benzoates include, but are not limited to, sodium benzoate and benzoic acid.

In another particular embodiment, the preservative is a sorbate. Sorbates include, but are not limited to, potassium sorbate, sodium sorbate, calcium sorbate, and sorbic acid.

In still another particular embodiment, the preservative is a nitrate and/or a nitrite. Nitrates and nitrites include, but are not limited to, sodium nitrate and sodium nitrite.

In yet another particular embodiment, the at least one preservative is a bacteriocin, such as, for example, nisin.

In another particular embodiment, the preservative is ethanol.

In still another particular embodiment, the preservative is ozone.

Non-limiting examples of antienzymatics suitable for use as preservatives in particular embodiments of the invention include ascorbic acid, citric acid, and metal chelating agents such as ethylenediaminetetraacetic acid (EDTA).

Hydration Agent

In certain embodiments, the functional ingredient is at least one hydration agent. As used herein, the at least one hydration agent may be single hydration agent or a plurality of hydration agents as a functional ingredient for the beverages provided herein. Generally, according to particular embodiments of this invention, the at least one hydration agent is present in the beverage in a concentration sufficient to promote health and wellness.

Hydration products help the body to replace fluids that are lost through excretion. For example, fluid is lost as sweat in order to regulate body temperature, as urine in order to excrete waste substances, and as water vapor in order to exchange gases in the lungs. Fluid loss can also occur due to a wide range of external causes, non-limiting examples of which include physical activity, exposure to dry air, diarrhea, vomiting, hyperthermia, shock, blood loss, and hypotension. Diseases causing fluid loss include diabetes, cholera, gastroenteritis, shigellosis, and yellow fever. Forms of malnutrition that cause fluid loss include the excessive consumption of alcohol, electrolyte imbalance, fasting, and rapid weight loss.

In a particular embodiment, the hydration product is a composition that helps the body replace fluids that are lost during exercise. Accordingly, in a particular embodiment, the hydration product is an electrolyte, non-limiting examples of which include sodium, potassium, calcium, magnesium, chloride, phosphate, bicarbonate, and combinations thereof. Suitable electrolytes for use in particular embodiments of this invention are also described in U.S. Pat. No. 5,681,569, the disclosure of which is expressly incorporated herein by reference. In particular embodiments, the electrolytes are obtained from their corresponding water-soluble salts. Non-limiting examples of salts for use in particular embodiments include chlorides, carbonates, sulfates, acetates, bicarbonates, citrates, phosphates, hydrogen phosphates, tartates, sorbates, citrates, benzoates, or combinations thereof. In other embodiments, the electrolytes are provided by juice, fruit extracts, vegetable extracts, tea, or teas extracts.

In particular embodiments of this invention, the hydration product is a carbohydrate to supplement energy stores burned by muscles. Suitable carbohydrates for use in particular embodiments of this invention are described in U.S. Pat. Nos. 4,312,856, 4,853,237, 5,681,569, and 6,989,171, the disclosures of which are expressly incorporated herein by reference. Non-limiting examples of suitable carbohydrates include monosaccharides, disaccharides, oligosaccharides, complex polysaccharides or combinations thereof. Non-limiting examples of suitable types of monosaccharides for use in particular embodiments include trioses, tetroses, pentoses, hexoses, heptoses, octoses, and nonoses. Non-limiting examples of specific types of suitable monosaccharides include glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, and sialose. Non-limiting examples of suitable disaccharides include sucrose, lactose, and maltose. Non-limiting examples of suitable oligosaccharides include saccharose, maltotriose, and maltodextrin. In other particular embodiments, the carbohydrates are provided by a corn syrup, a beet sugar, a cane sugar, a juice, or a tea.

In another particular embodiment, the hydration is a flavanol that provides cellular rehydration. Flavanols are a class of natural substances present in plants, and generally comprise a 2-phenylbenzopyrone molecular skeleton attached to one or more chemical moieties. Non-limiting examples of suitable flavanols for use in particular embodiments of this invention include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof. Several common sources of flavanols include tea plants, fruits, vegetables, and flowers. In preferred embodiments, the flavanol is extracted from green tea.

In a particular embodiment, the hydration product is a glycerol solution to enhance exercise endurance. The ingestion of a glycerol containing solution has been shown to provide beneficial physiological effects, such as expanded blood volume, lower heart rate, and lower rectal temperature.

Probiotics/Prebiotics

In certain embodiments, the functional ingredient is chosen from at least one probiotic, prebiotic and combination thereof. As used herein, the at least one probiotic or prebiotic may be single probiotic or prebiotic or a plurality of probiotics or prebiotics as a functional ingredient for the beverages provided herein. Generally, according to particular embodiments of this invention, the at least one probiotic, prebiotic or combination thereof is present in the beverage in a concentration sufficient to promote health and wellness.

Probiotics, in accordance with the teachings of this invention, comprise microorganisms that benefit health when consumed in an effective amount. Desirably, probiotics beneficially affect the human body's naturally-occurring gastrointestinal microflora and impart health benefits apart from nutrition. Probiotics may include, without limitation, bacteria, yeasts, and fungi.

According to particular embodiments, the probiotic is a beneficial microorganisms that beneficially affects the human body's naturally-occurring gastrointestinal microflora and imparts health benefits apart from nutrition. Examples of probiotics include, but are not limited to, bacteria of the genus *Lactobacilli*, *Bifidobacteria*, *Streptococci*, or combinations thereof, that confer beneficial effects to humans.

In particular embodiments of the invention, the at least one probiotic is chosen from the genus *Lactobacilli*. *Lactobacilli* (i.e., bacteria of the genus *Lactobacillus*, hereinafter "L.") have been used for several hundred years as a food preservative and for promoting human health. Non-limiting examples of species of *Lactobacilli* found in the human intestinal tract include *L. acidophilus*, *L. casei*, *L. fermentum*, *L. saliva roes*, *L. brevis*, *L. leichmannii*, *L. plantarum*, *L. cellobiosus*, *L. reuteri*, *L. rhamnosus*, *L. GG*, *L. bulgaricus*, and *L. thermophilus*.

According to other particular embodiments of this invention, the probiotic is chosen from the genus *Bifidobacteria*. *Bifidobacteria* also are known to exert a beneficial influence on human health by producing short chain fatty acids (e.g., acetic, propionic, and butyric acids), lactic, and formic acids as a result of carbohydrate metabolism. Non-limiting species of *Bifidobacteria* found in the human gastrointestinal tract include *B. angulatum*, *B. animalis*, *B. asteroides*, *B. bifidum*, *B. bourn*, *B. breve*, *B. catenulatum*, *B. choerinum*, *B. coryneforme*, *B. cuniculi*, *B. dentium*, *B. gallicum*, *B. gallinarum*, *B indicum*, *B. longum*, *B. magnum*, *B. merycicum*, *B. minimum*, *B. pseudocatenulatum*, *B. pseudolongum*, *B. psychraerophilum*, *B. pullorum*, *B. ruminantium*, *B. saeculare*, *B. scardovii*, *B. simiae*, *B. subtile*, *B. thermacidophilum*, *B. thermophilum*, *B. urinalis*, and B. sp.

According to other particular embodiments of this invention, the probiotic is chosen from the genus *Streptococcus*. *Streptococcus* thermophilus is a gram-positive facultative anaerobe. It is classified as a lactic acid bacteria and commonly is found in milk and milk products, and is used in the production of yogurt. Other non-limiting probiotic species of this bacteria include *Streptococcus salivarus* and *Streptococcus cremoris*.

Probiotics that may be used in accordance with this invention are well-known to those of skill in the art. Non-limiting examples of foodstuffs comprising probiotics include yogurt, sauerkraut, kefir, kimchi, fermented vegetables, and other foodstuffs containing a microbial element that beneficially affects the host animal by improving the intestinal microbalance. Prebiotics, in accordance with the teachings of this invention, are compositions that promote the growth of beneficial bacteria in the intestines. Prebiotic substances can be consumed by a relevant probiotic, or otherwise assist in keeping the relevant probiotic alive or stimulate its growth. When consumed in an effective amount, prebiotics also beneficially affect the human body's naturally-occurring gastrointestinal microflora and thereby impart health benefits apart from just nutrition. Prebiotic foods enter the colon and serve as substrate for the endogenous bacteria, thereby indirectly providing the host with energy, metabolic substrates, and essential micronutrients. The body's digestion and absorption of prebiotic foods is dependent upon bacterial metabolic activity, which salvages energy for the host from nutrients that escaped digestion and absorption in the small intestine.

Prebiotics, in accordance with the embodiments of this invention, include, without limitation, mucopolysaccharides, oligosaccharides, polysaccharides, amino acids, vitamins, nutrient precursors, proteins and combinations thereof.

According to a particular embodiment of this invention, the prebiotic is chosen from dietary fibers, including, without limitation, polysaccharides and oligosaccharides. These compounds have the ability to increase the number of probiotics, which leads to the benefits conferred by the probiotics. Non-limiting examples of oligosaccharides that are categorized as prebiotics in accordance with particular embodiments of this invention include fructooligosaccharides, inulins, isomalto-oligosaccharides, lactilol, lactosucrose, lactulose, pyrodextrins, soy oligosaccharides, trans-galacto-oligosaccharides, and xylo-oligosaccharides.

According to other particular embodiments of the invention, the prebiotic is an amino acid. Although a number of known prebiotics break down to provide carbohydrates for probiotics, some probiotics also require amino acids for nourishment.

Prebiotics are found naturally in a variety of foods including, without limitation, bananas, berries, asparagus, garlic, wheat, oats, barley (and other whole grains), flaxseed, tomatoes, Jerusalem artichoke, onions and chicory, greens (e.g., dandelion greens, spinach, collard greens, chard, kale, mustard greens, turnip greens), and legumes (e.g., lentils, kidney beans, chickpeas, navy beans, white beans, black beans).

Weight Management Agent

In certain embodiments, the functional ingredient is at least one weight management agent. As used herein, the at least one weight management agent may be single weight management agent or a plurality of weight management agents as a functional ingredient for the beverages provided herein. Generally, according to particular embodiments of this invention, the at least one weight management agent is present in the beverage in a concentration sufficient to promote health and wellness.

As used herein, "a weight management agent" includes an appetite suppressant and/or a thermogenesis agent. As used herein, the phrases "appetite suppressant", "appetite satiation compositions", "satiety agents", and "satiety ingredients" are synonymous. The phrase "appetite suppressant" describes macronutrients, herbal extracts, exogenous hormones, anorectics, anorexigenics, pharmaceutical drugs, and combinations thereof, that when delivered in an effective amount, suppress, inhibit, reduce, or otherwise curtail a person's appetite. The phrase "thermogenesis agent" describes macronutrients, herbal extracts, exogenous hormones, anorectics, anorexigenics, pharmaceutical drugs, and combinations thereof, that when delivered in an effective amount, activate or otherwise enhance a person's thermogenesis or metabolism.

Suitable weight management agents include macronutrient selected from the group consisting of proteins, carbohydrates, dietary fats, and combinations thereof. Consumption of proteins, carbohydrates, and dietary fats stimulates the release of peptides with appetite-suppressing effects. For example, consumption of proteins and dietary fats stimulates the release of the gut hormone cholecytokinin (CCK), while consumption of carbohydrates and dietary fats stimulates release of Glucagon-like peptide 1 (GLP-1).

Suitable macronutrient weight management agents also include carbohydrates. Carbohydrates generally comprise sugars, starches, cellulose and gums that the body converts into glucose for energy. Carbohydrates often are classified into two categories, digestible carbohydrates (e.g., monosaccharides, disaccharides, and starch) and non-digestible carbohydrates (e.g., dietary fiber). Studies have shown that non-digestible carbohydrates and complex polymeric carbohydrates having reduced absorption and digestibility in the small intestine stimulate physiologic responses that inhibit food intake. Accordingly, the carbohydrates embodied herein desirably comprise non-digestible carbohydrates or carbohydrates with reduced digestibility. Non-limiting examples of such carbohydrates include polydextrose; inulin; monosaccharide-derived polyols such as erythritol, mannitol, xylitol, and sorbitol; disaccharide-derived alcohols such as isomalt, lactitol, and maltitol; and hydrogenated starch hydrolysates. Carbohydrates are described in more detail herein below.

In another particular embodiment weight management agent is a dietary fat. Dietary fats are lipids comprising combinations of saturated and unsaturated fatty acids. Poly-unsaturated fatty acids have been shown to have a greater satiating power than mono-unsaturated fatty acids. Accordingly, the dietary fats embodied herein desirably comprise poly-unsaturated fatty acids, non-limiting examples of which include triacylglycerols.

In a particular embodiment, the weight management agents is an herbal extract. Extracts from numerous types of plants have been identified as possessing appetite suppressant properties. Non-limiting examples of plants whose extracts have appetite suppressant properties include plants of the genus *Hoodia, Trichocaulon, Caralluma, Stapelia, Orbea, Asclepias*, and *Camelia*. Other embodiments include extracts derived from Gymnema Sylvestre, Kola Nut, Citrus Auran tium, Yerba Mate, Griffonia Simplicifolia, Guarana, myrrh, guggul Lipid, and black current seed oil.

The herbal extracts may be prepared from any type of plant material or plant biomass. Non-limiting examples of plant material and biomass include the stems, roots, leaves, dried powder obtained from the plant material, and sap or dried sap. The herbal extracts generally are prepared by extracting sap from the plant and then spray-drying the sap. Alternatively, solvent extraction procedures may be employed. Following the initial extraction, it may be desirable to further fractionate the initial extract (e.g., by column chromatography) in order to obtain an herbal extract with enhanced activity. Such techniques are well known to those of ordinary skill in the art.

In a particular embodiment, the herbal extract is derived from a plant of the genus *Hoodia*, species of which include *H. alstonii*, *H. currorii*, *H. dregei*, *H. flava*, *H. gordonii*, *H. jutatae*, *H. mossamedensis*, *H. officinalis*, *H. parviflorai*, *H. pedicellata*, *H. pilifera*, *H. ruschii*, and *H. triebneri*. *Hoodia* plants are stem succulents native to southern Africa. A sterol glycoside of *Hoodia*, known as P57, is believed to be responsible for the appetite-suppressant effect of the *Hoodia* species.

In another particular embodiment, the herbal extract is derived from a plant of the genus *Caralluma*, species of which include *C. indica*, *C. fimbriata*, *C. attenuate*, *C. tuberculate*, *C. edulis*, *C. adscendens*, *C. stalagmifera*, *C. umbellate*, *C. penicillata*, *C. russeliana*, *C. retrospicens*, *C. Arabica*, and *C. lasiantha*. *Carralluma* plants belong to the same Subfamily as *Hoodia*, Asclepiadaceae. *Caralluma* are small, erect and fleshy plants native to India having medicinal properties, such as appetite suppression, that generally are attributed to glycosides belonging to the pregnane group of glycosides, non-limiting examples of which include caratuberside A, caratuberside B, bouceroside I, bouceroside II, bouceroside III, bouceroside IV, bouceroside V, bouceroside VI, bouceroside VII, bouceroside VIII, bouceroside IX, and bouceroside X.

In another particular embodiment, the at least one herbal extract is derived from a plant of the genus *Trichocaulon*. *Trichocaulon* plants are succulents that generally are native to southern Africa, similar to *Hoodia*, and include the species *T. piliferum* and *T. officinale*.

In another particular embodiment, the herbal extract is derived from a plant of the genus *Stapelia* or *Orbea*, species of which include *S. gigantean* and *O. variegate*, respectively. Both *Stapelia* and *Orbea* plants belong to the same Subfamily as *Hoodia*, Asclepiadaceae. Not wishing to be bound by any theory, it is believed that the compounds exhibiting appetite suppressant activity are saponins, such as pregnane glycosides, which include stavarosides A, B, C, D, E, F, G, H, I, J, and K.

In another particular embodiment, the herbal extract is derived from a plant of the genus *Asclepias*. *Asclepias* plants also belong to the Asclepiadaceae family of plants. Non-limiting examples of *Asclepias* plants include *A. incarnate*, *A. curassayica*, *A. syriaca*, and *A. tuberose*. Not wishing to be bound by any theory, it is believed that the extracts comprise steroidal compounds, such as pregnane glycosides and pregnane aglycone, having appetite suppressant effects.

In a particular embodiment, the weight management agent is an exogenous hormone having a weight management effect. Non-limiting examples of such hormones include CCK, peptide YY, ghrelin, bombesin and gastrin-releasing peptide (GRP), enterostatin, apolipoprotein A-IV, GLP-1, amylin, somastatin, and leptin.

In another embodiment, the weight management agent is a pharmaceutical drug. Non-limiting examples include phentenime, diethylpropion, phendimetrazine, sibutramine, rimonabant, oxyntomodulin, floxetine hydrochloride, ephedrine, phenethylamine, or other stimulants.

The at least one weight management agent may be utilized individually or in combination as a functional ingredient for the beverages provided in this invention.

Osteoporosis Management Agent

In certain embodiments, the functional ingredient is at least one osteoporosis management agent. As used herein, the at least one osteoporosis management agent may be single osteoporosis management agent or a plurality of osteoporosis management agent as a functional ingredient for the beverages provided herein. Generally, according to particular embodiments of this invention, the at least one osteoporosis management agent is present in the beverage in a concentration sufficient to promote health and wellness.

Osteoporosis is a skeletal disorder of compromised bone strength, resulting in an increased risk of bone fracture. Generally, osteoporosis is characterized by reduction of the bone mineral density (BMD), disruption of bone microarchitecture, and changes to the amount and variety of non-collagenous proteins in the bone.

In certain embodiments, the osteoporosis management agent is at least one calcium source. According to a particular embodiment, the calcium source is any compound containing calcium, including salt complexes, solubilized species, and other forms of calcium. Non-limiting examples of calcium sources include amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium citrate malate, calcium gluconate, calcium tartrate, calcium lactate, solubilized species thereof, and combinations thereof.

According to a particular embodiment, the osteoporosis management agent is a magnesium source. The magnesium source is any compound containing magnesium, including salt complexes, solubilized species, and other forms of magnesium. Non-limiting examples of magnesium sources include magnesium chloride, magnesium citrate, magnesium gluceptate, magnesium gluconate, magnesium lactate, magnesium hydroxide, magnesium picolate, magnesium sulfate, solubilized species thereof, and mixtures thereof. In another particular embodiment, the magnesium source comprises an amino acid chelated or creatine chelated magnesium.

In other embodiments, the osteoporosis agent is chosen from vitamins D, C, K, their precursors and/or beta-carotene and combinations thereof.

Numerous plants and plant extracts also have been identified as being effective in the prevention and treatment of osteoporosis. Not wishing to be bound by any theory, it is believed that the plants and plant extracts stimulates bone morphogenic proteins and/or inhibits bone resorption, thereby stimulating bone regeneration and strength. Non-limiting examples of suitable plants and plant extracts as osteoporosis management agents include species of the genus *Taraxacum* and *Amelanchier*, as disclosed in U.S. Patent Publication No. 2005/0106215, and species of the genus *Lindera*, *Artemisia*, *Acorus*, *Carthamus*, *Carum*, *Cnidium*, *Curcuma*, *Cyperus*, *Juniperus*, *Prunus*, *Iris*, *Cichorium*, *Dodonaea*, *Epimedium*, *Erigonoum*, *Soya*, *Mentha*, *Ocimum*, *thymus*, *Tanacetum*, *Plantago*, *Spearmint*, *Bixa*, *Vitis*, *Rosemarinus*, *Rhus*, and *Anethum*, as disclosed in U.S. Patent Publication No. 2005/0079232.

Phytoestrogen

In certain embodiments, the functional ingredient is at least one phytoestrogen. As used herein, the at least one phytoestrogen may be single phytoestrogen or a plurality of phytoestrogens as a functional ingredient for the beverages provided herein. Generally, according to particular embodiments of this invention, the at least one phytoestrogen is present in the beverages in a concentration sufficient to promote health and wellness.

Phytoestrogens are compounds found in plants which can typically be delivered into human bodies by ingestion of the plants or the plant parts having the phytoestrogens. As used herein, "phytoestrogen" refers to any substance which, when introduced into a body causes an estrogen-like effect of any degree. For example, a phytoestrogen may bind to estrogen receptors within the body and have a small estrogen-like effect.

Examples of suitable phytoestrogens for embodiments of this invention include, but are not limited to, isoflavones, stilbenes, lignans, resorcyclic acid lactones, coumestans, coumestrol, equol, and combinations thereof. Sources of suitable phytoestrogens include, but are not limited to, whole grains, cereals, fibers, fruits, vegetables, black cohosh, agave root, black currant, black haw, chasteberries, cramp bark, dong quai root, devil's club root, false unicorn root, ginseng root, groundsel herb, licorice, liferoot herb, motherwort herb, peony root, raspberry leaves, rose family plants, sage leaves, sarsaparilla root, saw palmetto berried, wild yam root, yarrow blossoms, legumes, soybeans, soy products (e.g., miso, soy flour, soymilk, soy nuts, soy protein isolate, tempen, or tofu) chick peas, nuts, lentils, seeds, clover, red clover, dandelion leaves, dandelion roots, fenugreek seeds, green tea, hops, red wine, flaxseed, garlic, onions, linseed, borage, butterfly weed, caraway, chaste tree, vitex, dates, dill, fennel seed, gotu kola, milk thistle, pennyroyal, pomegranates, southernwood, soya flour, tansy, and root of the kudzu vine (pueraria root) and the like, and combinations thereof.

Isoflavones belong to the group of phytonutrients called polyphenols. In general, polyphenols (also known as "polyphenolics"), are a group of chemical substances found in plants, characterized by the presence of more than one phenol group per molecule.

Suitable phytoestrogen isoflavones in accordance with embodiments of this invention include genistein, daidzein, glycitein, biochanin A, formononetin, their respective naturally occurring glycosides and glycoside conjugates, matairesinol, secoisolariciresinol, enterolactone, enterodiol, textured vegetable protein, and combinations thereof.

Suitable sources of isoflavones for embodiments of this invention include, but are not limited to, soy beans, soy products, legumes, alfalfa spouts, chickpeas, peanuts, and red clover.

Long-Chain Primary Aliphatic Saturated Alcohol

In certain embodiments, the functional ingredient is at least one long chain primary aliphatic saturated alcohol. As used herein, the at least one long chain primary aliphatic saturated alcohol may be single long chain primary aliphatic saturated alcohol or a plurality of long chain primary aliphatic saturated alcohols as a functional ingredient for the beverages provided herein. Generally, according to particular embodiments of this invention, the at least one long chain primary aliphatic saturated alcohol is present in the beverage in a concentration sufficient to promote health and wellness.

Long-chain primary aliphatic saturated alcohols are a diverse group of organic compounds. The term alcohol refers to the fact these compounds feature a hydroxyl group (—OH) bound to a carbon atom. The term primary refers to the fact that in these compounds the carbon atom which is bound to the hydroxyl group is bound to only one other carbon atom. The term saturated refers to the fact that these compounds feature no carbon to carbon pi bonds. The term aliphatic refers to the fact that the carbon atoms in these compounds are joined together in straight or branched chains rather than in rings. The term long-chain refers to the fact that the number of carbon atoms in these compounds is at least 8 carbons).

Non-limiting examples of particular long-chain primary aliphatic saturated alcohols for use in particular embodiments of the invention include the 8 carbon atom 1-octanol, the 9 carbon 1-nonanol, the 10 carbon atom 1-decanol, the 12 carbon atom 1-dodecanol, the 14 carbon atom 1-tetradecanol, the 16 carbon atom 1-hexadecanol, the 18 carbon atom 1-octadecanol, the 20 carbon atom 1-eicosanol, the 22 carbon 1-docosanol, the 24 carbon 1-tetracosanol, the 26 carbon 1-hexacosanol, the 27 carbon 1-heptacosanol, the 28 carbon 1-octanosol, the 29 carbon 1-nonacosanol, the 30 carbon 1-triacontanol, the 32 carbon 1-dotriacontanol, and the 34 carbon 1-tetracontanol.

In a particularly desirable embodiment of the invention, the long-chain primary aliphatic saturated alcohols are policosanol. Policosanol is the term for a mixture of long-chain primary aliphatic saturated alcohols composed primarily of 28 carbon 1-octanosol and 30 carbon 1-triacontanol, as well as other alcohols in lower concentrations such as 22 carbon 1-docosanol, 24 carbon 1-tetracosanol, 26 carbon 1-hexacosanol, 27 carbon 1-heptacosanol, 29 carbon 1-nonacosanol, 32 carbon 1-dotriacontanol, and 34 carbon 1-tetracontanol.

Long-chain primary aliphatic saturated alcohols are derived from natural fats and oils. They may be obtained from these sources by using extraction techniques well known to those of ordinary skill in the art. Policosanols can be isolated from a variety of plants and materials including sugar cane (*Saccharum officinarium*), yams (e.g. *Dioscorea opposite*), bran from rice (e.g. *Oryza sativa*), and beeswax. Policosanols may be obtained from these sources by using extraction techniques well known to those of ordinary skill in the art. A description of such extraction techniques can be found in U.S. Pat. Appl. No. 2005/0220868, the disclosure of which is expressly incorporated by reference.

Phytosterols

In certain embodiments, the functional ingredient is at least one phytosterol, phytostanol or combination thereof. Generally, according to particular embodiments of this invention, the at least one phytosterol, phytostanol or combination thereof is present in the beverage in a concentration sufficient to promote health and wellness.

As used herein, the phrases "stanol", "plant stanol" and "phytostanol" are synonymous.

Plant sterols and stanols are present naturally in small quantities in many fruits, vegetables, nuts, seeds, cereals, legumes, vegetable oils, bark of the trees and other plant sources. Although people normally consume plant sterols and stanols every day, the amounts consumed are insufficient to have significant cholesterol-lowering effects or other health benefits. Accordingly, it would be desirable to supplement food and beverages with plant sterols and stanols.

Sterols are a subgroup of steroids with a hydroxyl group at C-3. Generally, phytosterols have a double bond within the steroid nucleus, like cholesterol; however, phytosterols also may comprise a substituted sidechain (R) at C-24, such as an ethyl or methyl group, or an additional double bond. The structures of phytosterols are well known to those of skill in the art.

At least 44 naturally-occurring phytosterols have been discovered, and generally are derived from plants, such as corn, soy, wheat, and wood oils; however, they also may be produced synthetically to form compositions identical to those in nature or having properties similar to those of naturally-occurring phytosterols. According to particular embodiments of this invention, non-limiting examples of phytosterols well known to those or ordinary skill in the art include 4-desmethylsterols (e.g., β-sitosterol, campesterol, stigmasterol, brassicasterol, 22-dehydrobrassicasterol, and Δ5-avenasterol), 4-monomethyl sterols, and 4,4-dimethyl sterols (triterpene alcohols) (e.g., cycloartenol, 24-methylenecycloartanol, and cyclobranol).

As used herein, the phrases "stanol", "plant stanol" and "phytostanol" are synonymous. Phytostanols are saturated sterol alcohols present in only trace amounts in nature and also may be synthetically produced, such as by hydrogenation of phytosterols. According to particular embodiments of this invention, non-limiting examples of phytostanols include β-sitostanol, campestanol, cycloartanol, and saturated forms of other triterpene alcohols.

Both phytosterols and phytostanols, as used herein, include the various isomers such as the α and β isomers (e.g., α-sitosterol and β-sitostanol, which comprise one of the most effective phytosterols and phytostanols, respectively, for lowering serum cholesterol in mammals).

The phytosterols and phytostanols of the present invention also may be in their ester form. Suitable methods for deriving the esters of phytosterols and phytostanols are well known to those of ordinary skill in the art, and are disclosed in U.S. Pat. Nos. 6,589,588, 6,635,774, 6,800,317, and U.S. Patent Publication Number 2003/0045473, the disclosures of which are incorporated herein by reference in their entirety. Non-limiting examples of suitable phytosterol and phytostanol esters include sitosterol acetate, sitosterol oleate, stigmasterol oleate, and their corresponding phytostanol esters. The phytosterols and phytostanols of the present invention also may include their derivatives.

Generally, the amount of functional ingredient in the beverage varies widely depending on the particular beverage and the desired functional ingredient. Those of ordinary skill in the art will readily ascertain the appropriate amount of functional ingredient for each beverage.

EXAMPLES

Example 1: Sweetness Enhancement of Beverages Containing D-Psicose by Rebaudioside C Beverage Preparation
Beverages were Prepared with the Following Ingredients:

TABLE 1

D-Psicose in Citric Acid/Potassium Citrate Buffer

| Ingredient | Amount |
| --- | --- |
| Citric Acid | 0.18 g |
| Potassium Citrate | 0.06 g |
| D-psicose | 2.0 g |
| Water | 97.76 g |
| TOTAL | 100 g |

TABLE 2

D-Psicose and Rebaudioside C in Citric Acid/Potassium Citrate Buffer

| Ingredient | Amount |
| --- | --- |
| Citric Acid | 0.18 g |
| Potassium Citrate | 0.06 g |
| Rebaudioside C | 0.022 g |
| D-Psicose | 2.0 g |
| Water | 97.74 g |
| TOTAL | 100 g |

TABLE 3

D-Psicose in Lemon-Lime Carbonated Soft Drink

| Ingredient | Amount |
| --- | --- |
| Citric Acid | 0.18 g |
| Potassium Citrate | 0.06 g |
| D-Psicose | 2.0 g |
| Lemon lime flavor | 0.1 g |
| Water | 97.62 g |
| TOTAL | 100 g |

TABLE 4

D-Psicose and Rebaudioside C in Lemon-Lime Carbonated Soft Drink

| Ingredient | Amount |
| --- | --- |
| Citric Acid | 0.18 g |
| Potassium Citrate | 0.06 g |
| Rebaudioside C | 0.22 g |
| D-Psicose | 2.0 g |
| Lemon lime flavor | 0.1 g |
| Water | 97.64 g |
| TOTAL | 100 g |

TABLE 5

1% Sucrose in Citric Acid/Potassium Citrate Buffer*

| Ingredient | Amount |
| --- | --- |
| Citric Acid | 0.18 g |
| Potassium Citrate | 0.06 g |
| Sucrose | 1.0 g |
| Water | 98.76 g |
| TOTAL | 100 g |

*1.5% sucrose solution was made using 1.5 g sucrose; 2.0% sucrose solution was made using 2.0 g sucrose For beverages with the citric acid/potassium citrate buffer, the ingredients were added to treated water while stirring until solids were visibly dissolved. Afterwards, the pH, Brix and titratable acidity were measured (see Table 6) and the beverage was poured into a glass bottle and stored at 4° C.

For lemon-lime carbonated soft drink beverages, the ingredients were added to treated water sufficient to constitute a syrup. 5.5 parts of carbonated water was then added to 1 part of the syrup to constitute a finished beverage with a carbonation of 3.7 volumes of carbon dioxide Afterwards, the pH, Brix, and titratable acidity were measured (see Table 6) and the beverage was poured into a glass bottle and stored at 4° C.

TABLE 6 pH, Brix and Titratable Acidity of Beverages

| Beverage | pH | Brix | Titratable Acidity (% w/w citric acid) |
| --- | --- | --- | --- |
| 2% D-Psicose in Citric Acid/ Potassium Citrate Buffer | 3.29 | 2.2 | 0.195 |
| 2% D-Psicose and 220 ppm Rebaudioside C in Citric Acid/ Potassium Citrate Buffer | 3.29 | 2.2 | 0.195 |
| 2% D-Psicose Lemon-lime Carbonated Soft Drink | 3.28 | 2.2 | 0.195 |

TABLE 6-continued pH, Brix and Titratable Acidity of Beverages

| Beverage | pH | Brix | Titratable Acidity (% w/w citric acid) |
|---|---|---|---|
| 2% D-Psicose and 220 ppm Rebaudioside C in Lemon-lime Carbonated Soft Drink | 3.28 | 2.2 | 0.195 |

Taste Evaluation

Taste tests were carried out with eight panelists. Bottles were removed from the refrigerator and about 50 ml of beverage was poured into 4 oz-plastic cups. Panelists were given mineral water to rinse their mouth before tasting and between tasting different samples. Unsalted crackers were also given to panelists to eat. Taste tests were done in two rounds: a first round in which a sample of D-psicose in citric acid/potassium citrate buffer and a sample of D-psicose and Reb-C in citric acid/potassium citrate buffer were evaluated, and a second round in which a sample of D-psicose in a lemon lime carbonated soft drink and a sample of D-psicose and Reb-C in a lemon lime carbonated soft drink were evaluated. In each round, panelists were asked to e choose the sweetest sample among the pair, then rate the sweetness level against control solutions of 1%, 1.5%, and 2% sucrose in citric acid/potassium citrate buffer.

All eight panelists identified the sample containing 2% D-psicose and 220 ppm Rebaudioside C as the sweeter sample, regardless of which beverage matrix was used.

The majority of panelists determined the sample containing 2% D-psicose and 220 ppm Rebaudioside C as having the same or greater sweetness than the 2% sucrose in citric acid/potassium citrate buffer. 2% D-psicose has a sweetness equivalence of 1.2% sucrose in the absence of Rebaudioside C. Rebaudioside C at 220 ppm in citric acid/potassium citrate buffer has a sucrose equivalence of less than 1.0%. Accordingly, 220 ppm Rebaudioside C acted to enhance the sweetness of the citric acid/potassium citrate buffer-based beverage containing 2% D-psicose.

Example 2: Taste Improvement of Beverages Containing Rebaudioside A

Beverage Preparation

Enhanced water beverages were prepared with the ingredients provided in Tables 7 and 8 Ingredients were added to treated water and mixed until completely dissolved. For each formulation, 5 liters of beverage was made, pasteurized (90° C. for 30 sec), hot-filled in 20 oz plastic bottles and stored at ambient temperature. Some bottles were randomly picked and kept in the refrigerator at 4° C. for taste evaluation.

TABLE 7

Enhanced Water Beverage with Rebaudioside A and D-Psicose

| Ingredient | Amount (g) |
|---|---|
| Water | 98.87 |
| D-Psicose | 0.5 |
| Citric Acid | 0.216 |
| Mineral Blend | 0.204 |
| Vitamin Premix | 0.049 |
| Rebaudioside A (>97%) | 0.02 |
| Lemon-lime flavor | 0.141 |
| TOTAL | 100 g |

TABLE 8

Enhanced Water Beverage with Rebaudioside A and Erythritol

| Ingredient | Amount (g) |
|---|---|
| Water | 98.87 |
| Erythritol | 0.5 |
| Citric Acid | 0.216 |
| Mineral Blend | 0.204 |
| Vitamin Premix | 0.049 |
| Rebaudioside A (>97%) | 0.02 |
| Lemon-lime flavor | 0.141 |
| TOTAL | 100 g |

Taste Evaluation

Taste tests were carried out with 5 panelists. Bottles were removed from the refrigerator and about 50 ml of beverage poured in 4 oz-plastic cups. Panelists were given mineral water to rinse their mouth before tasting, also between tasting different samples. Unsalted crackers were also given to panelists. Two samples (50 ml each) were randomly presented and each panelist was asked to evaluate each sample for overall sweetness and taste profile, and then select the one with a better taste profile. One sample was the enhanced water beverage of Table 7 (D-psicose and Rebaudioside A) at 4° C. and the other sample was the enhanced water beverage of Table 8 (D-psicose and erythritol) at 4° C.

All panelists chose the enhanced water beverage of Table 7 containing D-psicose and Rebaudioside A over the enhanced water beverage of Table 8 containing erythritol and Rebaudioside A. A number of panelists noted that the flavor of the D-psicose/Rebaudioside A beverage was more rounded in flavor while the Rebaudioside A/erythritol beverage was more sharp and acidic.

Example 3: Taste Improvement of Lemon-Lime Carbonated Soft Drinks (CSD) Containing Rebaudioside A With D-Psicose Beverage Preparation Lemon-lime carbonated soft drinks were prepared with the ingredients provided in Tables 9-11. The ingredients were dissolved in treated water in the amount enough to constitute a syrup, from which 1 part was mixed with 5.5 parts of carbonated water to constitute a finished beverage with a carbonation of 3.7 volumes of carbon dioxide ($CO_2$). Finished beverages were poured in 300 ml-glass bottles and stored in the refrigerator at 4° C. until taste evaluation.

TABLE 9

Lemon-lime Carbonated Soft Drink with 360 ppm Rebaudioside A and 2% D-Psicose

| Ingredient | Amount (g) |
|---|---|
| Water | 97.66 |
| D-Psicose | 2.0 |
| Citric Acid | 0.18 |
| Potassium Citrate | 0.06 |
| Potassium Benzoate | 0.025 |
| Rebaudioside A (>97%) | 0.036 |
| Lemon-lime flavor | 0.039 |
| TOTAL | 100 g |

TABLE 10

Lemon-lime Carbonated Soft Drink
with 400 ppm Rebaudioside A and 2% D-Psicose

| Ingredient | Amount (g) |
|---|---|
| Water | 97.656 |
| D-Psicose | 2.0 |
| Citric Acid | 0.18 |
| Potassium Citrate | 0.06 |
| Potassium Benzoate | 0.025 |
| Rebaudioside A (>97%) | 0.040 |
| Lemon-lime flavor | 0.039 |
| TOTAL | 100 g |

TABLE 11

Lemon-lime Carbonated Soft Drink with 420 ppm Rebaudioside A

| Ingredient | Amount (g) |
|---|---|
| Water | 99.656 |
| Citric Acid | 0.18 |
| Potassium Citrate | 0.06 |
| Potassium Benzoate | 0.025 |
| Rebaudioside A (>97%) | 0.042 |
| Lemon-lime flavor | 0.039 |
| TOTAL | 100 g |

Taste Evaluation

Taste tests were carried out with 5 panelists. Bottles were removed from the refrigerator and about 50 ml of beverage poured in 4 oz-plastic cups. Panelists were given mineral water to rinse their mouth before tasting and between tasting different samples. Unsalted crackers were also given. Three samples were randomly presented and each panelist was asked to evaluate each sample for overall sweetness and taste profile, and then select the one with a better taste profile. One sample was the lemon-lime carbonated soft drink of Table 9, a second sample was the lemon-lime carbonated soft drink of Table 10 and a third sample was the lemon-lime carbonated soft drink of Table 11.

All panelists chose sample the lemon-lime carbonated soft drink of Table 9 containing 360 ppm Rebaudioside A and 2% D-psicose (1:5.5 weight ratio) as the most rounded in sweetness and flavor with no aftertaste, no bitterness and no sweetness lingering. The sample was also found to have the sweetness profile most similar to sucrose. All panelists chose the lemon-lime carbonated soft drink of Table 10 containing 400 ppm Rebaudioside A and 2% D-psicose (1:5 weight ratio) as the next best tasting sample. The sample of the lemon-lime carbonated soft drink of Table 11 was reported to have bitterness and some sweetness lingering properties.

Example 4: Taste Evaluation of Lemon-Lime Carbonated Soft Drink (CSD) Sweetened with D-Psicose with a Sweetness of 10 Brix Sucrose Equivalent A lemon lime carbonated soft drink (CSD) was made by dissolving all ingredients (Table 12) in treated water and carbonating the beverage to a final carbonation of 3.7 volumes of carbon dioxide. Beverages were filled in glass bottles and stored in the refrigerator (4° C.) until taste evaluation.

TABLE 12

Lemon-lime Carbonated Soft Drink with D-Psicose

| Ingredient | Amount (g) |
|---|---|
| Water | 83.5 |
| D-Psicose | 16.2 |
| Citric Acid | 0.18 |
| Potassium Citrate | 0.06 |
| Potassium Benzoate | 0.025 |
| Lemon-lime flavor | 0.039 |
| TOTAL | 100 g |

Samples were evaluated by 5 panelists. Bottles were removed from the refrigerator and about 50 ml of beverage poured in 4 oz-plastic cups. Panelists were given mineral water to rinse their mouth before and during tasting. Unsalted crackers were also given. The formula was evaluated for the overall sweetness and taste profile. All panelists found the formula with a pleasant and an acceptable sweetness and taste profile.

Example 5: Sweetness Enhancement of Beverages Containing D-Psicose by 2,4-Dihydroxybenzoic Acid D-Psicose was evaluated at its concentration equivalent to 5% sucrose equivalence (5% SE), or the concentration required to have the same sweetness as of a 5% sucrose solution. 2,4-Dihydroxybenzoic acid was used at 500 ppm, corresponding to its maximum value allowable in non-alcoholic beverages.

First, the sweetness level of 2,4-dihydroxybenzoic acid was evaluated against three solutions of 1%, 2%, and 3% sucrose. Second, the sweetness level of a solution containing D-psicose and 500 ppm 2,4-dihydroxybenzoic acid was evaluated against 5%, 6.5%, and 7% sucrose solutions. All solutions were made in citric acid/potassium citrate buffer.

Solutions were prepared with the ingredients provided in Tables 13-15. All ingredients were dissolved in treated water. Citric acid and potassium citrate were added in a sufficient amount to bring the final pH to 3.2. Solutions were filled in 300 ml-glass bottles and chilled in the refrigerator before tasting.

TABLE 13

2,4-Dihydroxybenzoic acid (500 ppm) in citric acid buffer solution

| Ingredients | Amount (grams) |
|---|---|
| Water | 99.85 |
| Citric Acid | 0.075 |
| Potassium Citrate | 0.025 |
| 2,4-Dihydroxibenzoic Acid | 0.05 |
| TOTAL | 100 g |

TABLE 14

D-Psicose in citric acid buffer solution

| Ingredient (grams) | 5% SE D-Psicose | 5% SE D-Psicose + 500 ppm 2,4-Dihydroxybenzoic acid |
|---|---|---|
| Water | 91.57 | 91.52 |
| Citric Acid | 0.075 | 0.075 |
| Potassium Citrate | 0.025 | 0.025 |

TABLE 14-continued

D-Psicose in citric acid buffer solution

| Ingredient (grams) | 5% SE D-Psicose | 5% SE D-Psicose + 500 ppm 2,4-Dihydroxybenzoic acid |
|---|---|---|
| 2,4-Dihydroxybenzoic Acid | — | 0.05 |
| D-Psicose | 8.33 | 8.33 |
| TOTAL | 100 g | 100 g |

TABLE 15

Sucrose in citric acid buffer solutions

| Ingredient (grams) | 1% Sucrose | 2% Sucrose | 3% Sucrose | 5% Sucrose | 6.5% Sucrose | 7% Sucrose |
|---|---|---|---|---|---|---|
| Water | 98.9 | 97.9 | 96.9 | 94.9 | 93.4 | 92.9 |
| Citric Acid | 0.075 | 0.075 | 0.075 | 0.075 | 0.075 | 0.075 |
| Potassium Citrate | 0.025 | 0.025 | 0.025 | 0.025 | 0.025 | 0.025 |
| Sucrose | 1 | 2 | 3 | 5 | 6.5 | 7 |
| TOTAL | 100 g | 100 g | 100 g | 100 g | 100 g | 100 g |

Taste Evaluation

Beverages were kept in the refrigerator overnight and tasted cold the following day. Two panelists evaluated the beverages. Bottles were removed from the refrigerator and about 20 ml of beverage poured in 2 oz-plastic cups. Mineral water was given for palate rinsing before tasting and between tasting different samples. Unsalted crackers were also given.

First, the panelists assessed the sweetness of 500 ppm 2,4-dihydroxybenzoic acid in citric acid buffer against 1%, 2% and 3% sucrose solutions in citric acid buffer. The panelists found that 500 ppm 2,4-dihydroxybenzoic acid had a sweetness slightly below the sweetness of 1% sucrose solution. Next, a D-psicose solution (5% SE) was evaluated for its sweetness against 5% and 6.5% sucrose solutions, where it was found to be equally sweet to 5% sucrose solution.

The D-psicose solution (5% SE) with 500 ppm 2,4-dihydroxybenzoic acid was then evaluated for overall sweetness against 5%, 6.5%, and 7% sucrose solutions. The two panelists found that its overall sweetness was a little higher than 6.5% sucrose solution.

The results showed that 2,4-dihydroxybenzoic acid acted as a sweetness enhancer for D-psicose.

Example 6: Sweetness Enhancement of Beverages Containing D-Psicose With FEMA GRAS Flavor 4774

D-Psicose was evaluated at its concentration equivalent to 5% sucrose equivalence (5% SE), or the concentration required to have the same sweetness as of a 5% sucrose solution. FEMA GRAS flavor 4774 (4-Amino-5-(3-isopropylamino)-2,2-dimethyl-3-oxopropoxy)-2-methylquinoline-3-carboxylic acid) was synthetized as disclosed in U.S. Patent Application Publication No. 2013/0041046A1 and the PCT Application Publication NO. WO2012/021837A2. It was found to have a purity greater than 95%, as determined by $^1$H NMR and LCMS.

The FEMA GRAS flavor 4774 was evaluated at 20 ppm. First, the sweetness level of FEMA GRAS flavor 4774 was evaluated against three solutions of 1%, 1.5%, and 2% sucrose. Second, the sweetness level of a solution containing D-psicose and 20 ppm FEMA GRAS flavor 4774 was evaluated against 5%, 6%, and 7% sucrose solutions. All solutions were made in citric acid/potassium citrate buffer Solutions were prepared with the ingredients provided in Tables 16-18. All ingredients were dissolved in treated water. Citric acid and potassium citrate were added in a sufficient amount to bring the final pH to 3.2. Solutions were filled in 300 ml-glass bottles and chilled in the refrigerator before tasting.

TABLE 16

FEMA GRAS flavor 4774 (20 ppm) in citric acid buffer solution

| Ingredients | Amount (grams) |
|---|---|
| Water | 99.9 |
| Citric Acid | 0.075 |
| Potassium Citrate | 0.025 |
| FEMA GRAS Flavor 4774 | 0.002 |
| TOTAL | 100 g |

TABLE 17

D-Psicose in citric acid buffer solution

| Ingredient (grams) | 5% SE D-Psicose | 5% SE D-Psicose + 20 ppm of FEMA 4774 |
|---|---|---|
| Water | 91.57 | 91.57 |
| Citric Acid | 0.075 | 0.075 |
| Potassium Citrate | 0.025 | 0.025 |
| FEMA GRAS Flavor 4774 | — | 0.002 |
| D-Psicose | 8.33 | 8.33 |
| TOTAL | 100 g | 100 g |

TABLE 18

Sucrose in citric acid buffer solutions

| Ingredient (grams) | 1% Sucrose | 1.5% Sucrose | 2% Sucrose | 5% Sucrose | 6% Sucrose | 7% Sucrose |
|---|---|---|---|---|---|---|
| Water | 98.9 | 98.4 | 97.9 | 94.9 | 93.9 | 92.9 |
| Citric Acid | 0.075 | 0.075 | 0.075 | 0.075 | 0.075 | 0.075 |
| Potassium Citrate | 0.025 | 0.025 | 0.025 | 0.025 | 0.025 | 0.025 |
| Sucrose | 1 | 1.5 | 2 | 5 | 6 | 7 |
| TOTAL | 100 g | 100 g | 100 g | 100 g | 100 g | 100 g |

Taste Evaluation

Beverages were kept in the refrigerator overnight and tasted cold the following day. Three panelists evaluated the beverages. Bottles were removed from the refrigerator and about 20 ml of beverage poured in 2 oz-plastic cups. Mineral water was given for thorough palate rinsing before tasting and between tasting different samples. Unsalted crackers were also given.

First, the panelists assessed the sweetness of a 20 ppm FEMA GRAS flavor 4774 solution in citric acid buffer against 1%, 1.5% and 2% sucrose solutions in citric acid buffer. The panelists found that the sample had sweetness below the sweetness of 1% sucrose solution. In fact, no sweetness was detected. Next, a solution of D-psicose (5% SE) in citric acid buffer solution was evaluated for its sweetness against 5% and 6.5% sucrose solutions, where it was found to be equally sweet to 5% sucrose in citric acid buffer solution.

A solution containing D-psicose (5% SE) and 20 ppm FEMA GRAS flavor 4774 was evaluated against 5%, 6%, and 7% sucrose solutions, all in citric acid buffer. The three panelists found that its overall sweetness was between 6% and 7% sucrose, but very close to 7% sucrose solution.

The results showed that FEMA GRAS flavor 4774 acted as a sweetness enhancer for D-psicose.

Example 7: Sweetness Enhancement of Beverages Containing D-Psicose with 4-Amino-5-(Cyclohexyloxy)-2-Methylquinoline-3-Carboxylic Acid D-Psicose was evaluated at its concentration equivalent to 5% sucrose equivalence (5% SE), or the concentration required to have the same sweetness as of a 5% sucrose solution. 4-Amino-5-(cyclohexyloxy)-2-methylquinoline-3-carboxylic acid was prepared according to U.S. Patent Application Publication No. 2013/0041046 A1. It was found to have a purity greater than 95%, as determined by $^1$H NMR and LCMS.

4-Amino-5-(cyclohexyloxy)-2-methylquinoline-3-carboxylic acid was evaluated at 30 ppm. First, the sweetness level of the compound was evaluated against three solutions of 1%, 1.5%, and 2% sucrose. Second, the sweetness level of a solution containing D-psicose and 30 ppm amino-5-(cyclohexyloxy)-2-methylquinoline-3-carboxylic acid was evaluated against 5%, 6%, and 7% sucrose solutions.

A solution containing a blend of sucrose and D-psicose with a total sweetness equivalent to 5.5% sucrose (3.5% sucrose and 2% SE D-psicose) was also made and evaluated for its sweetness with and without addition of 30 ppm 4-amino-5-(cyclohexyloxy)-2-methylquinoline-3-carboxylic acid. All solutions were made in citric acid/potassium citrate buffer.

Solutions were prepared with the ingredients provided in Tables 19-22. All ingredients were dissolved in treated water. Citric acid and potassium citrate were added in a sufficient amount to bring the final pH to 3.2. Solutions were filled in 300 ml-glass bottles and chilled in the refrigerator before tasting.

TABLE 19

4-Amino-5-(cyclohexyloxy)-2-methylquinoline-3-carboxylic acid (30 ppm) in citric acid buffer

| Ingredients | Amount (grams) |
| --- | --- |
| Water | 99.9 |
| Citric Acid | 0.075 |
| Potassium Citrate | 0.025 |
| 4-Amino-5-(cyclohexyloxy)-2-methylquinoline-3-carboxylic acid | 0.003 |
| TOTAL | 100 g |

TABLE 20

D-Psicose in citric acid buffer

| Ingredient (grams) | 5% SE D-Psicose | 5% SE D-Psicose + 30 ppm of 4-Amino-5-(cyclohexyloxy)-2-methylquinoline-3-carboxylic acid |
| --- | --- | --- |
| Water | 91.57 | 91.57 |
| Citric Acid | 0.075 | 0.075 |
| Potassium Citrate | 0.025 | 0.025 |
| 4-Amino-5-(cyclohexyloxy)-2-methylquinoline-3-carboxylic acid | — | 0.003 |
| D-Psicose | 8.33 | 8.33 |
| TOTAL | 100 g | 100 g |

TABLE 21

Sucrose and D-Psicose blend in citric acid buffer

| Ingredient (grams) | 3.5% Sucrose + 2% SE D-Psicose | 3.5% Sucrose + 2% SE D-Psicose + 30 ppm of 4-Amino-5-(cyclohexyloxy)-2-methylquinoline-3-carboxylic acid |
| --- | --- | --- |
| Water | 93.07 | 93.07 |
| Citric Acid | 0.075 | 0.075 |
| Potassium Citrate | 0.025 | 0.025 |
| 4-Amino-5-(cyclohexyloxy)-2-methylquinoline-3-carboxylic acid | — | 0.003 |
| Sucrose | 3.5 | 3.5 |
| D-Psicose (2% SE) | 3.33 | 3.33 |
| TOTAL | 100 g | 100 g |

TABLE 22

Sucrose in citric acid buffer

| Ingredient (grams) | 1% Sucrose | 1.5% Sucrose | 2% Sucrose | 5% Sucrose | 6% Sucrose | 7% Sucrose | 8% Sucrose | 9% Sucrose | 10% Sucrose |
| --- | --- | --- | --- | --- | --- | --- | --- | --- | --- |
| Water | 98.9 | 98.4 | 97.9 | 94.9 | 93.9 | 92.9 | 91.9 | 90.9 | 89.9 |
| Citric Acid | 0.075 | 0.075 | 0.075 | 0.075 | 0.075 | 0.075 | 0.075 | 0.075 | 0.075 |
| Potassium Citrate | 0.025 | 0.025 | 0.025 | 0.025 | 0.025 | 0.025 | 0.025 | 0.025 | 0.025 |
| Sucrose | 1 | 1.5 | 2 | 5 | 6 | 7 | 8 | 9 | 10 |
| TOTAL | 100 g | 100 g | 100 g | 100 g | 100 g | 100 g | 100 g | 100 g | 100 g |

Taste Evaluation

Beverages were kept in the refrigerator overnight and tasted cold the following day. Two panelists evaluated the beverages. Bottles were removed from the refrigerator and about 20 ml of beverage poured in 2 oz-plastic cups. Mineral water was given for thorough palate rinsing before tasting and between tasting different samples. Unsalted crackers were also given.

First, the panelists assessed the sweetness of 30 ppm 4-amino-5-(cyclohexyloxy)-2-methylquinoline-3-carboxylic acid solution in citric acid buffer against 1%, 1.5% and 2% sucrose solutions in citric acid buffer. The panelists found that 30 ppm of the above compound had sweetness below the sweetness of the 1% sucrose solution. Next, D-psicose (5% SE) in citric acid buffer solution was evaluated for its sweetness against 5% and 6% sucrose solutions, where it was found to be equally sweet to 5% sucrose in citric acid buffer solution.

The solution containing D-psicose (5% SE) and 30 ppm 4-amino-5-(cyclohexyloxy)-2-methylquinoline-3-carboxylic acid was evaluated last against 5%, 6%, and 7% sucrose solutions, all in citric acid buffer. The two panelists found that its overall sweetness was more than 7% sucrose, around 7.5% sucrose solution.

Four panelists evaluated the solution containing the sucrose and D-psicose blend with and without 30 ppm 4-amino-5-(cyclohexyloxy)-2-methylquinoline-3-carboxylic acid. Sucrose (3.5%) and D-psicose (2% SE) in citric acid buffer solution was evaluated for its overall sweetness and was found to be around 5.5% SE. Next, panelists evaluated the sucrose and D-psicose blend with the addition of 30 ppm 4-amino-5-(cyclohexyloxy)-2-methylquinoline-3-carboxylic acid, using 8%, 9%, and 10% sucrose in citric acid buffer solutions as controls. All panelists found that the solution was sweeter than 10% sucrose control, about 10.5% SE.

The experiment showed that D-psicose sweetness was enhanced by about 2.5% SE (50% enhancement) with 4-amino-5-(cyclohexyloxy)-2-methylquinoline-3-carboxylic acid when this compound was used at a level of 30 ppm, which provided no perceived sweetness when used alone. In addition, the total sweetness enhancement (10.5% sucrose) was greater than the sum of enhancement provided by 30 ppm 4-amino-5-(cyclohexyloxy)-2-methylquinoline-3-carboxylic when used in combination with the sugars individually (7% for sucrose, US Patent Application US20130041046A, and 3% SE for D-psicose).

Example 8: Sweetness Enhancement of Beverages Containing D-Tagatose With FEMA GRAS FLAVOR 4701

D-Tagatose was evaluated at its concentration equivalent to 5% sucrose equivalent (5% SE), or the concentration required to have the same sweetness as of a 5% sucrose solution. FEMA GRAS FLAVOR 4701 was prepared according to PCT Application Publication No. WO2010/014666. FEMA GRAS FLAVOR 4701 was used at 15 ppm, corresponding to its maximum value allowable in non-alcoholic beverages.

The sweetness level of D-tagatose and FEMA GRAS FLAVOR 4701 was evaluated against 5%, 6%, and 7% sucrose solutions. All solutions were made in citric acid/potassium citrate buffer Solutions were prepared with the ingredients provided in Tables 23-25. All ingredients were dissolved in treated water. Citric acid and potassium citrate were added in a sufficient amount to bring the final pH to 3.2. Solutions were filled in 300 ml-glass bottles and chilled in the refrigerator before tasting.

TABLE 23

FEMA GRAS FLAVOR 4701 (15 ppm) in citric acid buffer

| Ingredients | Amount (grams) |
|---|---|
| Water | 99.9 |
| Citric Acid | 0.075 |
| Potassium Citrate | 0.025 |
| FEMA GRAS FLAVOR 4701 | 0.0015 |
| TOTAL | 100 g |

TABLE 24

D-Tagatose in citric acid buffer

| Ingredient (grams) | 5% SE Tagatose | 5% SE Tagatose + 15 ppm FEMA GRAS FLAVOR 4701 |
|---|---|---|
| Water | 94.47 | 94.468 |
| Citric Acid | 0.075 | 0.075 |
| Potassium Citrate | 0.025 | 0.025 |
| FEMA GRAS FLAVOR 4701 | — | 0.0015 |
| D-Tagatose | 5.43 | 5.43 |
| TOTAL | 100 g | 100 g |

TABLE 25

Sucrose in citric acid buffer

| Ingredient (grams) | 5% Sucrose | 6% Sucrose | 7% Sucrose |
|---|---|---|---|
| Water | 94.9 | 93.9 | 92.9 |
| Citric Acid | 0.075 | 0.075 | 0.075 |
| Potassium Citrate | 0.025 | 0.025 | 0.025 |
| Sucrose | 5 | 6 | 7 |
| TOTAL | 100 g | 100 g | 100 g |

Taste Evaluation

Beverages were made and chilled at 4° C. before tasting. Two panelists evaluated the beverages. Bottles were removed from the refrigerator and about 20 ml of beverage poured in 2 oz-plastic cups. Mineral water was given to panelists for palate rinsing before tasting and between tasting different samples. Unsalted crackers were also given.

First, a solution containing D-tagatose (5% SE) in citric acid buffer was evaluated for its sweetness against 5% and 6% sucrose solutions in citric acid buffer, where it was found to be equally sweet to 5% sucrose solution.

Second, a solution containing D-tagatose (5% SE) and 15 ppm FEMA GRAS FLAVOR 4701 was evaluated for its overall sweetness against 5%, 6%, and 7% sucrose solutions in citric acid buffer. The two panelists found that its sweetness was a slightly higher than 6% sucrose solution.

A solution of 15 ppm FEMA GRAS flavor 4701 in citric acid buffer had a sucrose equivalence less than 1.0%. Accordingly, FEMA GRAS FLAVOR 4701 acted as a sweetness enhancer for D-tagatose.

Example 9: D-Psicose as Taste Modulator for Steviol Glycosides in Lemon-Lime Carbonated Soft Drinks (CSD)

The performance of D-psicose in lemon lime CSD was evaluated to and assess whether this ingredient can modulate in a positive way the sweetness and taste brought by steviol glycosides (Rebaudioside A and Rebaudioside M), particularly by reducing or suppressing their sweet lingering, bitterness and licorice aftertaste. Lemon lime CSD were made with 1) sucrose, steviol glycosides and D-psicose (60% and 30% reduced calorie), 2) steviol glycosides and D-psicose (zero calorie) and compared with full sugar one (control) in terms of overall sweetness and taste profile.

Beverage Preparation

Lemon lime CSD were made first by making syrup from which 1 part was mixed with 5.5 parts of carbonated water to constitute a finished beverage with a carbonation of 3.7 volumes of carbon dioxide ($CO_2$). Dry ingredients were dissolved in the syrup water followed by dissolving the lemon lime flavor. Citric acid and buffer were added in a sufficient amount to bring pH to 3.3 and total titratable acidity (TTA) to 0.117% w/v in finished beverages. Finished beverages were filled in 300 ml-glass bottles and stored at ambient temperature for one week before taste evaluation.

Lemon-lime carbonated soft drinks were prepared with the ingredients provided in Tables 26-29.

TABLE 26

30% reduced calorie lemon-lime CSD

| Ingredient | Amount (g) |
|---|---|
| Water | 91.54 |
| Citric acid | 0.117 |
| Sodium citrate | 0.027 |
| Sodium benzoate | 0.018 |
| Rebaudioside-A 97% | 0.0075 |
| D-psicose | 1.2 |
| Sucrose | 7 |
| Lemon-lime flavor | 0.087 |
| TOTAL | 100 g |

TABLE 27

60% reduced calorie lemon-lime CSD

| Ingredient | Amount (g) |
|---|---|
| Water | 92.24 |
| Citric acid | 0.117 |
| Sodium citrate | 0.027 |
| Sodium benzoate | 0.018 |
| Rebaudioside-A 97% | 0.015 |
| D-psicose | 3.5 |
| Sucrose | 4 |
| Lemon-lime flavor | 0.087 |
| TOTAL | 100 g |

TABLE 28

Zero calorie lemon-lime CSD

| Ingredient | Amount (g) |
|---|---|
| Water | 97.6 |
| Citric acid | 0.117 |
| Sodium citrate | 0.027 |
| Sodium benzoate | 0.018 |
| Rebaudioside-M | 0.05 |
| D-psicose | 2.1 |
| Lemon-lime flavor | 0.087 |
| TOTAL | 100 g |

TABLE 29

Full sugar (control) lemon-lime CSD

| Ingredient | Amount (g) |
|---|---|
| Water | 89.75 |
| Citric acid | 0.117 |
| Sodium citrate | 0.027 |
| Sodium benzoate | 0.018 |
| Sucrose | 10 |
| Lemon-lime flavor | 0.087 |
| TOTAL | 100 g |

Taste Evaluation

A trained panel evaluated the 30% (n=14) and 60% reduced calorie lemon lime CSD (n=13), while the zero calorie lemon lime CSD was evaluated by an expert panel (n=3) made up of product developers. A triangle test was used to compare the 30% and 60% reduced calorie beverages to the full sugar control. In each set, the trained panel was randomly given 3 samples in which two were the same and one different and asked to choose the one different. For the zero calorie lemon lime CSD, expert panelists were given evaluation sheets and asked to write comments on overall sweetness and taste profile. After one week at room temperature, beverages were refrigerated and served cold. Bottles were removed from the refrigerator and about 50 ml of beverage poured in 4 oz-plastic cups. Panelists were given mineral water for mouth rinsing before tasting and between tasting different samples. Unsalted crackers were also given to panelists to eat followed by mouth-rinsing with mineral water before tasting the next sample.

The triangle test where the 30% reduced calorie lemon lime CSD was compared to the full sugar control showed that among the 14 panelists, six chose the correct sample while eight chose the incorrect sample as different (p-value 0.31). The triangle test on the 60% reduced calorie lemon lime in comparison with the full sugar control showed that among the 13 panelists, four chose the correct sample while 9 chose the incorrect sample as different (p-value 0.68). These results showed that the panelists could not detect differences between the reduced calorie lemon lime CSD formulated with D-psicose and Rebaudioside A and the full sugar control formulated with sucrose. At such low sugar content, Rebaudioside A sweet lingering, bitterness, licorice aftertaste and less mouth feel are easily detected. The results showed that D-psicose modulated Rebaudiose A and improved the overall sweetness and taste profile, making it possible to formulate beverages with fewer calories with improved taste.

The evaluation of the zero calorie lemon lime CSD by the expert panel showed that it had a faster and more rounded sweetness and flavor profile, with very low sweet lingering and no bitterness or licorice aftertaste, showing that D-psicose helped reduce or eliminate these unwanted characteristics.

What is claimed is:

1. A mid-calorie beverage comprising citric acid;
Rebaudioside M in a purity greater than about 80% and present in an amount from about 25 ppm to about 100 ppm; and
D-psicose in an amount from about 1.5% to about 2.0% by weight.

2. The beverage of claim 1, wherein the Rebaudioside M is in a purity greater than about 95%.

3. The beverage of claim 1, further comprising at least one additional sweetener selected from the group consisting of natural sweeteners, synthetic high potency sweeteners and combinations thereof.

4. The beverage of claim 1, further comprising one or more additives selected from the group consisting of carbohydrates, polyols, amino acids and their corresponding salts, poly-amino acids and their corresponding salts, sugar acids and their corresponding salts, nucleotides, organic acids, inorganic acids, organic salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof.

5. The beverage of claim 1, further comprising one or more functional ingredients selected from the group consisting of saponins, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof.

6. The beverage of claim 1, wherein the beverage further comprises sucrose.

7. The beverage of claim 1, wherein the beverage is a carbonated soft drink or fruit juice.

* * * * *